United States Patent
Singh et al.

(10) Patent No.: US 12,222,911 B1
(45) Date of Patent: Feb. 11, 2025

(54) STRING DATA ERROR DETECTION AND REPAIR

(71) Applicant: Microsoft Technology Licensing, LLC, Redmond, WA (US)

(72) Inventors: Mukul Singh, Delhi (IN); José Pablo Cambronero Sánchez, New Haven, CT (US); Sumit Gulwani, Sammamish, WA (US); Vu Minh Le, Redmond, WA (US); Carina Suzana Negreanu, Cambridge (GB); Gust Ben Anneloes Verbruggen, Keerbergen (BE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/374,131

(22) Filed: Sep. 28, 2023

(51) Int. Cl.
| | |
|---|---|
| *G06F 16/215* | (2019.01) |
| *G06F 16/23* | (2019.01) |
| *G06F 40/18* | (2020.01) |
| *G06F 40/30* | (2020.01) |
| *G06N 3/0455* | (2023.01) |

(52) U.S. Cl.
CPC ........ *G06F 16/215* (2019.01); *G06F 16/2365* (2019.01); *G06F 40/18* (2020.01); *G06F 40/30* (2020.01); *G06N 3/0455* (2023.01)

(58) Field of Classification Search
CPC ............................ G06F 16/215; G06F 16/2365
See application file for complete search history.

(56) References Cited

U.S. PATENT DOCUMENTS

| | | | |
|---|---|---|---|
| 11,568,423 B2* | 1/2023 | Miller | G06Q 50/18 |
| 2004/0002994 A1* | 1/2004 | Brill | G06F 40/232 |
| 2007/0016616 A1* | 1/2007 | Brill | G06F 40/232 |
| 2022/0215948 A1* | 7/2022 | Bardot | G16H 40/40 |

OTHER PUBLICATIONS

Singh, et al., "DataVinci: Learning Syntactic and Semantic String Repairs", arXiv:2308.10922v1 [cs.DB] Aug. 21, 2023, 13 pages.
"Data Cleansing Tool", retrieved from << https://docs.trifacta.com/display/AAC/Data+Cleansing+Tool >>, no later than Aug. 23, 2023, 3 pages.
Hiba Abu Ahmad, Hongzhi Wang, "Automatic Weighted Matching Rectifying Rule Discovery for Data Repairing", retrieved from << https://arxiv.org/abs/1909.09807 >>, Sep. 21, 2019, 24 pages.

(Continued)

*Primary Examiner* — Baoquoc N To
(74) *Attorney, Agent, or Firm* — Ogilvie Law Firm

(57) ABSTRACT

Some embodiments perform fully unsupervised string error detection and repair, for strings containing both syntactic errors and semantic errors. In some embodiments, string error mitigation includes learning a regular-expression-based pattern that characterizes at least a predefined fraction of a set of string data values, identifying and masking a semantic substring, deriving edits to repair a string which contains the semantic substring, and replacing a mask value with a replacement substring that conforms to the pattern. Some embodiments utilize a language model. Some embodiments include or utilize a pattern learner, one or more learned significant patterns, and a repair engine. Some embodiments exploit program execution information to generate patterns when significant patterns are not initially found.

20 Claims, 21 Drawing Sheets

(56) References Cited

OTHER PUBLICATIONS

Tom B. Brown, et al., "Language Models are Few-Shot Learners", retrieved from << https://proceedings.neurips.cc/paper/2020/file/1457c0d6bfcb4967418bfb8ac142f64a-Paper.pdf >>, no later than Dec. 31, 2020, 25 pages.
Chen, et al., "Data Extraction via Semantic Regular Expression Synthesis", retrieved from << https://arxiv.org/pdf/2305.10401.pdf >>, Aug. 24, 2023, 42 pages.
Chu, et al., "Data Cleaning: Overview and Emerging Challenges", retrieved from << https://dl.acm.org/doi/pdf/10.1145/2882903.2912574 >>, Jun. 26-Jul. 1, 2016, 6 pages.
Alireza Heidari, et al., "HoloDetect: Few-Shot Learning for Error Detection", retrieved from << https://arxiv.org/abs/1904.02285 >>, Apr. 4, 2019, 18 pages.
Huang, et al., "Auto-Detect: Data-Driven Error Detection in Tables", retrieved from << https://dl.acm.org/doi/10.1145/3183713.3196889 >>, Jun. 10-15, 2018, 16 pages.
Madelon Hulsebos, et al., "Sherlock: A Deep Learning Approach to Semantic Data Type Detection", retrieved from << https://vis.csail.mit.edu/pubs/sherlock.pdf >>, Aug. 4-8, 2019, 9 pages.
Krishnan, et al., "ActiveClean: interactive data cleaning for statistical modeling", retrieved from << https://dl.acm.org/doi/10.14778/2994509.2994514 >>, no later than Dec. 31, 2016, 12 pages.
Mohammad Mahdavi, et al., "Baran: Effective Error Correction via a Unified Context Representation and Transfer Learning", retrieved from << http://www.vldb.org/pvldb/vol13/p1948-mahdavi.pdf >>, no later than Dec. 31, 2020, 14 pages.
Mohammad Mahdavi, et al., "Semi-Supervised Data Cleaning with Raha and Baran", retrieved from << https://www.cidrdb.org/cidr2021/papers/cidr2021_paper14.pdf >>, Jan. 10-13, 2021, 7 pages.
Mohammad Mahdavi, et al., "Raha: A Configuration-Free Error Detection System", retrieved from << https://dspace.mit.edu/bitstream/handle/1721.1/137524/raha.pdf?sequence=2&isAllowed=y >>, Jun. 30-Jul. 5, 2019, 19 pages.
"Clean, transform, and load data in Power BI", retrieved from << https://learn.microsoft.com/en-us/training/modules/clean-data-power-bi/ >>, no later than Aug. 23, 2023, 2 pages.
Avanika Narayan, et al., "Can Foundation Models Wrangle Your Data?", retrieved from << https://arxiv.org/abs/2205.09911 >>, Dec. 24, 2022, 12 pages.
Saswat Padhi, et al., "FlashProfile: A Framework for Synthesizing Data Profiles", retrieved from << https://arxiv.org/abs/1709.05725 >>, Apr. 16, 2019, 28 pages.
Qahtan, et al., "Pattern functional dependencies for data cleaning", retrieved from << https://dspace.mit.edu/handle/1721.1/133951.2 >>, no later than Dec. 31, 2020, 14 pages.
Colin Raffel, et al., "Exploring the Limits of Transfer Learning with a Unified Text-to-Text Transformer", retrieved from << https://jmlr.org/papers/v21/20-074.html >>, no later than Dec. 31, 2020, 67 pages.
Vijayshankar Raman and Joseph M. Hellerstein, "Potter's Wheel: An Interactive Data Cleaning System", retrieved from << http://control.cs.berkeley.edu/pwheel-vldb.pdf >>, no later than Dec. 31, 2001, 10 pages.
Rekatsinas, et al., "HoloClean: holistic data repairs with probabilistic inference", retrieved from << https://dl.acm.org/doi/10.14778/3137628.3137631 >>, Aug. 1, 2017, 12 pages.
Ristad, et al., "Learning string-edit distance", retrieved from << http://pnylab.com/papers/sed/sed.pdf >>, no later than Oct. 31, 1997, 34 pages.
Singh, et al., "CORNET: Learning Table Formatting Rules by Example", retrieved from << https://arxiv.org/abs/2208.06032 >>, Dec. 5, 2022, 14 pages.
Michael Sipser, "Introduction to the Theory of Computation", retrieved from << https://dl.acm.org/doi/10.1145/230514.571645 >>, no later than Mar. 31, 1996, 3 pages.
"Minimum Edit Distance", retrieved from << https://web.stanford.edu/class/cs124/lec/med.pdf >>, no later than Dec. 31, 2016, 52 pages.
Ashish Vaswani, et al., "Attention Is All You Need", retrieved from << https://proceedings.neurips.cc/paper/2017/file/3f5ee243547dee91fbd053c1c4a845aa-Paper.pdf >>, no later than Dec. 31, 2017, 11 pages.
Gust Verbruggen, et al., "Semantic programming by example with pre-trained models", retrieved from << https://dl.acm.org/doi/10.1145/3485477 >>, Oct. 15, 2021, 25 pages.
Wang, et al., "Uni-Detect: A Unified Approach to Automated Error Detection in Tables", retrieved from << https://dl.acm.org/doi/10.1145/3299869.3319855 >>, Jun. 25, 2019, 18 pages.
Wang, et al., "CodeT5: Identifier-aware Unified Pre-trained Encoder-Decoder Models for Code Understanding and Generation", retrieved from << https://aclanthology.org/2021.emnlp-main.685/ >>, no later than Nov. 30, 2021, 13 pages.
Martin Breitbach, et al., "DataVinci: Proactive Data Placement for Ad-Hoc Computing", retrieved from << https://store.computer.org/csdl/proceedings-article/ipdpsw/2021/357700a866/1uHgNOzyiDC >>, no later than Dec. 31, 2021, 3 pages.
"Analyze Data in Excel", retrieved from << https://support.microsoft.com/en-us/office/analyze-data-in-excel-3223aab8-1543-4fda-85ed-76bb0295ffc4 >>, no later than Sep. 27, 2023, 6 pages.

* cited by examiner

Wikipedia

| Mixing | Length | Area |
|---|---|---|
| 47 (7.55%) | 04:34 | Birmingham |
| 38 (6.09%) | 05:23 | London |
| 26 (4.24%) | 04:38 | Wales |
| 21 (3.42%) | 03:45 | Hampton |
| 19 (3.05%) | 03:34 | Rockford |
| 16 (2.66%) | 04:55 | Birminxham |
| 19 (3.05%) | 03:22 | London |
| 16 (2.66%) | 04:12 | Wales |

Fig. 6

```
You are an expert in masking semantic types in data...
Keep the following points in mind.
1. Mask semantic units in strings.
2. Only mask the semantic types specified.
...                                              Task Description
```

```
semantic types: name, country, currency, ...  Semantic Types
```

```
<Task>                                                Examples
Data Column: John102, Malt109, Sophie893, ...
Masked Column: {name(John)}102, {name(Matt)}109, ...
...
```

```
<Examples>                                           Inference
Data Column: US-123, u.k.-392, IND-292, UK-21, ...
Masked Column:
```

Fig. 7

Excel

| Phone | Code | Website |
|---|---|---|
| 937-587-3389 | US-837 | https://www.google.com |
| 419-996-7110 | UK-828 | https://www.youtube.com |
| 440-993-8351 | US-219 | www.facebook.com |
| (937) 509 6413 | us291 | https://www.twitter.com |
| 937-587-3389 | POL-921 | https://www.instagram.com |
| 419-908-7099 | AUS-463 | https://www.linkedin.com |
| 4405764039 | USA-392 | https://www.reddit.com |
| 419-6310-239 | UK-389 | https://www.amazon.com |

Fig. 8

Column
| Code |
|---|
| A2.A3.A4. |
| A2.A3. |
| AAA3 |
| A5.A7. |
| A8.A9. |
Regex
(A[0-9].)+
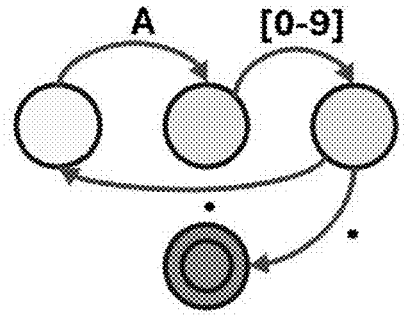
NFA
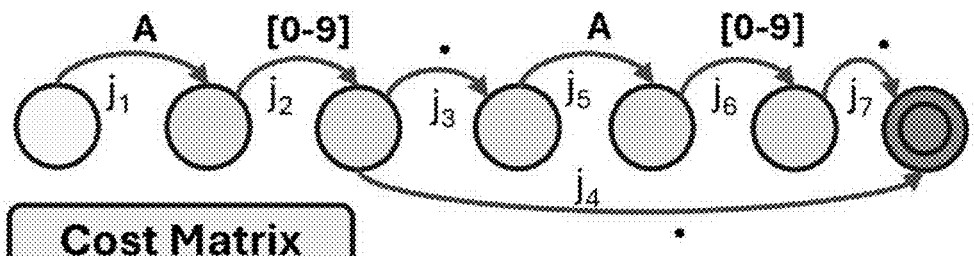
Unrolled DAG
Cost Matrix
|   | A | [0-9] | . | A | [0-9] | . |
|---|---|---|---|---|---|---|
| A | 0 | 1 | 2 | 3 | 4 | 5 |
| A | 1 | 1 | 2 | 2 | 3 | 4 |
| A | 2 | 2 | 2 | 2 | 3 | 4 |
| 3 | 3 | 3 | 3 | 2 | 2 | 3 |
Moves Matrix
|   | A | [0-9] | . | A | [0-9] | . |
|---|---|---|---|---|---|---|
| A | M | I(0-9) | I(.) | I(A) | I(0-9) | I(.) |
| A | D(A) | S(0-9) | I(.) | I(A) | M | I(.) |
| A | D(A) | D(A) | S(.) | M | M | I(.) |
| 3 | D(3) | D(3) | D(3) | D(3) | M | I(.) |
Fig. 11

| Action | Shorthand | Delete | Emits | Cost |
|---|---|---|---|---|
| match() | M | | | 0 |
| insert(c) | I(c) | | c | 1 |
| delete() | D | ✓ | | 1 |
| substitute(c) | S(c) | ✓ | c | 1 |

Fig. 12

| | | |
|---|---|---|
| equals(v, s) | contains(v, s) | startsWith(v, s) |
| endsWith(v, s) | length(v, n) | hasDigits(v) |
| isNum(v) | isError(v) | isFormula(v) |
| isLogical(v) | isNA(v) | isText(v) |

Fig. 13

| Dataset | Metrics | # Tables | # Col | # Row |
|---|---|---|---|---|
| Wikipedia Tables | Precision, Fire Rate | 1000 | 5.1 | 27.3 |
| Excel | Precision, Fire Rate | 200 | 1.6 | 523.4 |
| Synthetic Errors | Precision, Recall, F1 | 1000 | 4.3 | 447.5 |
| Excel Formulas | Execution Success | 11000 | 1.4 | 216.5 |

Fig. 14

| System | Wikipedia | | Excel | | Synthetic | | |
| --- | --- | --- | --- | --- | --- | --- | --- |
| | Precision | Fire Rate | Precision | Fire Rate | Precision | Recall | F1 Score |
| WMRR | 70.0 | 2.93% | 65.8 | 2.76% | 55.3 | 66.8 | 60.5 |
| HoloClean | 67.0 | 3.87% | 65.2 | 2.50% | 52.1 | 64.1 | 57.5 |
| Raha | 68.9 | 4.03% | 66.4 | 3.74% | 59.5 | 68.2 | 63.6 |
| Potters-Wheel | 66.2 | – | – | – | – | – | – |
| Auto-Detect | 78.5 | – | – | – | – | – | – |
| T5 | 60.8 | 27.47% | 53.8 | 19.02% | 40.5 | 56.3 | 47.1 |
| GPT-3.5 | 73.9 | 10.99% | 60.4 | 11.71% | 50.1 | 69.8 | 58.3 |
| DATAVINCI | 80.1 | 16.85% | 75.1 | 14.39% | 67.4 | 73.4 | 70.3 |

Fig. 15

| System | Wikipedia | | Excel | | Synthetic | | |
|---|---|---|---|---|---|---|---|
| | Precision (Certain) | Precision (Possible) | Precision (Certain) | Precision (Possible) | Precision* | Recall | F1 Score* |
| WMRR | 61.1 | 57.8 | 59.2 | 55.6 | 43.2 | 61.1 | 50.6 |
| HoloClean | 58.4 | 55.6 | 59.0 | 54.9 | 41.3 | 58.6 | 48.5 |
| Raha + GPT-3.5 | 58.6 | 54.8 | 56.4 | 53.5 | 45.2 | 62.0 | 52.3 |
| Potter's-Wheel + GPT-3.5 | 56.2 | 52.0 | - | - | - | - | - |
| Auto-Detect + GPT-3.5 | 66.9 | 63.3 | - | - | - | - | - |
| T5 | 41.0 | 37.8 | 37.7 | 35.2 | 27.9 | 47.0 | 35.0 |
| GPT-3.5 | 63.9 | 55.5 | 52.1 | 48.9 | 38.2 | 63.8 | 47.8 |
| DATAVINCI | 71.3 | 64.9 | 71.2 | 64.6 | 54.1 | 68.9 | 60.6 |

Fig. 16

| System | Wikipedia | Excel | Synthetic |
|---|---|---|---|
| WMRR | 87.3 | 89.9 | 78.2 |
| HoloClean | 87.1 | 90.5 | 79.3 |
| Raha + GPT-3.5 | 85.0 | 85.0 | 76.0 |
| Potter's-Wheel + GPT-3.5 | 84.9 | – | – |
| Auto-Detect + GPT-3.5 | 85.2 | – | – |
| T5 | 67.4 | 70.1 | 68.8 |
| GPT-3.5 | 86.5 | 86.3 | 76.3 |
| DATAVINCI | 89.0 | 91.2 | 80.3 |

Fig. 17

| | Single Column | | Multi Column | |
|---|---|---|---|---|
| Type | Formula | Cell | Formula | Cell |
| No Repair | 0.0% | 85.8% | 0.0% | 81.4% |
| WMRR | 32.6% | 94.4% | 29.6% | 90.1% |
| Raha + GPT-3.5 | 34.5% | 92.6% | 31.4% | 88.3% |
| T5 | 11.2% | 89.4% | 6.4% | 86.2% |
| DATAVINCI Unsupervised | 43.2% | 94.3% | 35.7% | 90.9% |
| DATAVINCI+Execution | 54.0% | 96.5% | 47.8% | 94.0% |

Fig. 18

| Category | Player ID |
|---|---|
| Professional | Ind-674-PRO |
| Junior | US-823-JUN |
| Junior | US-237-JUN |
| Staff | QUAL-47 |
| Staff | QUAL-21 |
| Professional | Zim-843-PRO |
| Junior | Eng-781-JUN |
| Professional | Aus-664-PRO |
| Staff | QUAL-88 |
| Junior | Ind-473-JUN |
| Professional | usa_837 |
| Junior | Eng-573-JUN |
| Professional | Zim-392-PRO |
| Staff | QUAL-10 |

DataVinci: US-837-PRO ✓

GPT-3.5: USA-837-PRO ✗

WMRR: No Detection ✗

Raha: US-837-JUN ✗

T5: usa-837 ✗

Ground Truth: US-837-PRO

| Action |
|---|
| Cross |
| Pass0 |
| Pass |
| Flash |
| Flash0 |
| Cross0 |
| Pass |
| Flash |

✗ DataVinci: No Detection

✓ Raha:
Pass0 → Pass
Flash0 → Flash
Cross0 → Cross (2)

| Option |
|---|
| Beaker |
| 23.4 |
| RD12 |
| Rd13 |
| RD14 |
| Flask |
| 10.6 |
| @Filed |

✗ DataVinci: No Detection

✓ GPT-3.5: Rd13 → RD13

Fig. 20

| Option | Formula |
|--------|---------|
| Chrome23 | 23 |
| Chrome21 | 21 |
| C30 | #ERROR |
| Chrome19 | 19 |
| Chrome22 | 22 |
| C15 | #ERROR |
| C26 | #ERROR |
| Chrome17 | 17 |
| Chrome20 | 20 |
| Chrome25 | 25 |
| Chrome18 | 18 |

=RIGHT(A48,
    LEN(A48)
       - SEARCH("Chrome",A48)
       - LEN("Chrome")
  +1)

DataVinci (Unsupervised)
No Detection ✗

DataVinci (Execution)
C30 → Chrome30
C15 → Chrome15
C26 → Chrome26 ✓

Fig. 21

| Model | Precision | Recall | F1 |
|-------|-----------|--------|-----|
| No semantic abstraction | 50.3 | 62.9 | 55.9 |
| Limited semantic concretization | 52.0 | 65.6 | 58.0 |
| No learned concretization | 46.3 | 51.0 | 48.5 |
| Edit distance ranking | 53.2 | 67.1 | 69.3 |
| DATAVINCI | 54.1 | 68.9 | 60.6 |

Fig. 22

| System | Time(ms) | Disk(MB) | Memory(MB) |
|--------|----------|----------|------------|
| WMRR | 247.4 | 4.6 | 914.5 |
| HoloClean | 1049.3 | 996.3 | 1647.2 |
| Raha | 321.8 | 65.3 | 645.4 |
| Potter's-Wheel* | 110.0 | - | - |
| Auto-Detect* | 290.0 | - | - |
| T5 | 858.3 | 886.2 | 1534.2 |
| GPT-3.5 | 1325.6 | - | - |
| DATAVINCI | 261.5 | 5.6 | 10.5 |

Fig. 23

$<Country>-\d\{3\}-(PRO|JUN)$ $QUAL-\d\{2\}$

STRING DATA ERROR DETECTION AND REPAIR

BACKGROUND

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

In some computers and other devices, some operating systems, applications, and other software programs have a user interface which permits interaction between the software and a human user. These interactions sometimes include commands from a human user intended to influence or control the program's behavior. Sometimes the interactions input data into the program for processing. Sometimes the interactions output data from the program, as a result of data processing.

Many software programs of various kinds, including many different kinds of user interfaces intended for various kinds of interactions, have been deployed over the course of several decades. However, improvements in human-computer-interaction technology and the processing of data are still possible.

SUMMARY

Some embodiments provide or utilize a string error mitigation method, which includes: learning a regular-expression-based pattern that characterizes at least a predefined fraction of a set of string data values; identifying, and masking out with a mask value, a substring based on a predefined set of semantic data types; deriving one or more edits to repair a string which contains the mask value; and replacing the mask value by a replacement substring which conforms to the regular-expression-based pattern.

Some embodiments provide or utilize a string error mitigation system, which includes: a pattern learner interface which sends a set of string data values to a pattern learner, and receives a set of one or more significant patterns from the pattern learner, the set of significant patterns including a set of one or more regular expressions which collectively match a majority or other predefined fraction of the string data values, and which also collectively define at least one outlier string data value; and a repair engine interface which sends a repair engine at least one significant pattern and at least one outlier string data value, and receives at least one edit program from the repair engine which edits the outlier string data value to produce an edited outlier string data value which conforms to at least one significant pattern.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 6 is a diagram illustrating string data errors in tables;

FIG. 7 is a diagram illustrating components of a semantic abstraction prompt structure;

FIG. 8 is a diagram illustrating string data errors in spreadsheets;

FIG. 9 and FIG. 10 jointly form a data flow diagram illustrating a string error mitigation architecture, in which FIG. 9 shows a lefthand initial portion of the data flow diagram, and FIG. 10 shows a righthand final portion of the data flow diagram;

FIG. 11 is a multipart diagram illustrating an example operation and structure of a string error mitigation repair engine;

FIG. 12 is a table showing examples of edit actions over characters;

FIG. 13 is a table showing examples of supported predicate templates and their arguments;

FIG. 14 is a table showing examples of benchmark properties and metrics;

FIG. 15 is a table showing examples of error detection performance across datasets;

FIG. 16 is a table showing examples of error repair performance across datasets;

FIG. 17 is a table showing examples of repair precision when only correctly detected errors are considered;

FIG. 18 is a table showing examples of execution success rates;

FIG. 19 is a diagram illustrating a first set of examples of string error repair success and failure;

FIG. 20 is a diagram illustrating a second set of examples of string error repair success and failure;

FIG. 21 is a diagram illustrating a third set of examples of string error repair success and failure;

FIG. 22 is a table showing examples of repair precision on a synthetically corrupted dataset benchmark;

FIG. 23 is a table showing examples of computational resource usage;

FIGS. 31 through 37 collectively illustrate use of a pattern to drive edits of the FIG. 30 outlier, in which FIG. 31 shows the pattern and a state transition diagram, FIG. 32 shows abstraction of an outlier string data value by a language model, FIG. 33 shows the state transition diagram in a start state, FIG. 34 shows the state transition diagram in a state S1, FIG. 35 shows the state transition diagram in a state S2, FIG. 36 shows the state transition diagram in an accept state accepting a substring abstraction, and FIG. 37 shows concretizing the substring abstraction and thereby editing the substring in a manner that repairs syntactic and semantic errors in the outlier string data value.

DETAILED DESCRIPTION

Overview

Figure 1:
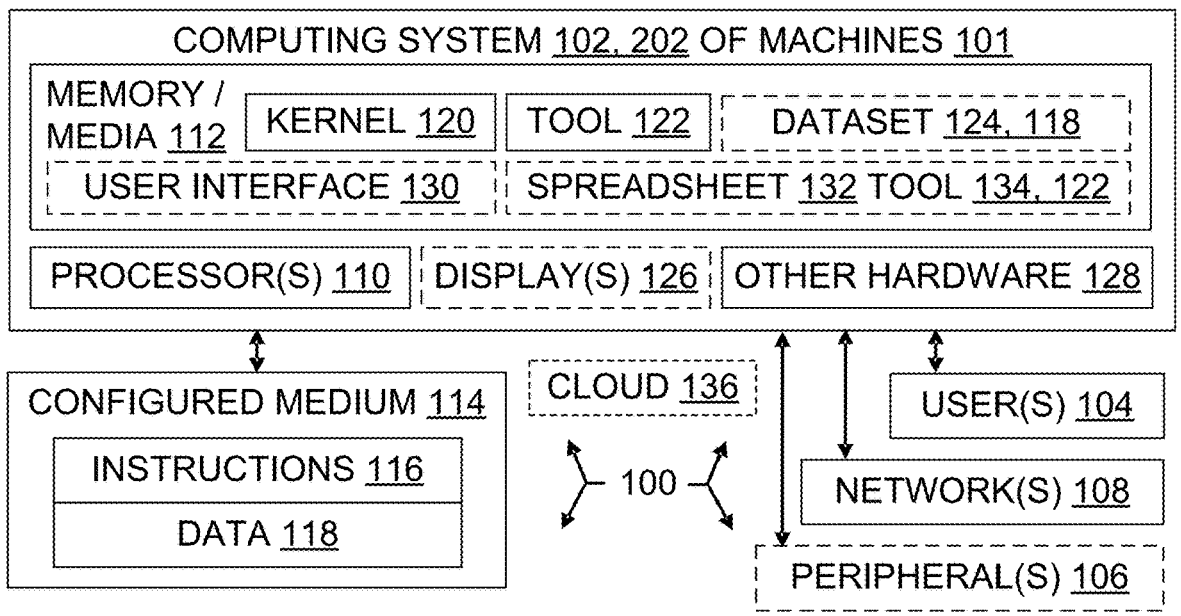
FIG. 1 is a diagram illustrating aspects of computer systems and also illustrating configured storage media, including some aspects generally suitable for systems which provide string error mitigation functionality.

Some teachings described herein were motivated by technical challenges faced during efforts to improve spreadsheet technology. In particular, challenges were faced during efforts to improve data cleaning technology incorporated in or invoked by spreadsheet applications in order to detect (at the least) and to repair (optimally) errors in string data. These challenges were motivations for the present disclosure, but teachings herein are not limited in their scope or applicability to those particular motivational challenges. For example, embodiments are not limited to spreadsheet applications, or to the particular language models evaluated during internal testing.

String data is common in real-world datasets: 67.6% of values in a sample of 1.8 million real Excel® spreadsheets from the web were represented as text (mark of Microsoft Corporation). Systems that successfully clean such string data can have a significant positive impact on real users. However, some proposed approaches have been limited to error detection, or require that the user provide annotations, examples, or constraints to fix the errors. Furthermore, some approaches focused independently on syntactic errors or semantic errors in strings, without fully cleaning strings that contain both syntactic and semantic substrings.

Some embodiments described herein provide a fully unsupervised string data error detection and repair system. Some embodiments learn regular-expression-based patterns that cover a majority or other predefined fraction of values in a column, list, or other set of string data and report values that do not satisfy such patterns as data errors. Some embodiments can automatically derive edits to a data error based on the majority pattern(s) and on constraint(s) learned over other columns, lists, or sets, without the need for further user interaction. To handle strings having both syntactic and semantic substrings, some embodiments use a large language model (LLM) to abstract and concretize portions of strings that are semantic prior to learning majority patterns and deriving edits. Because not all data can result in majority patterns, some embodiments leverage execution information from an existing program which reads the target data, to identify and correct data repairs that would not otherwise be identified. During internal evaluation, some embodiments outperformed seven baselines on both error detection and error repair. Note that abstraction herein is a technical operation; see discussions of "abstract", "concrete", "mask", "semantic type", and related terms, not a reference to or a concession of any relevance of, legal case law on abstract ideas and subject matter eligibility.

Some embodiments relate to detecting and repairing data in strings. Data obtained from various sources often is formatted as a string and will also often include some errors. Importing data that includes errors into an application can cause problems in many different ways. Some embodiments according to teachings herein detect errors in strings and repair the errors without particular user input other than the strings. Some embodiments leverage information from any program which reads the data, to correct data repairs that would otherwise not be identified Some embodiments use both regular-expression-based patterns and LLMs to detect and correct errors.

Embodiments described herein provide efficient, effective, and fast alternatives to an approach in which, for example, only syntactic errors are addressed, or an approach in which only semantic errors are addressed.

Syntactic errors are errors detectable automatically by lexical analysis, regular expression matching, directed graph traversal, non-deterministic finite automata (NFA) traversal, traversal of a directed graph that approximates an NFA, or other mechanisms consistent with the examples herein of syntax (a.k.a. syntactic) error detection. As used here, "syntax error" means an error according to a syntax definition, not an error in a syntax definition. An example of a syntax error is the presence of a non-alphanumeric value where only alphanumeric values are permitted by a syntax. Semantic errors distinguish between syntactically identical values on the basis of meaning recognition, as determined, e.g., by a value's presence in an external dictionary, database, word list, or other source of permitted values. An example of a semantic error is "green" where only "black" or "white" is expected, or "green" where "phone" or "tablet" is expected, or "Atlantis" where the name of a city in the U.S. state of Georgia is expected.

Some embodiments taught herein provide a technical advantage of not merely detecting string data errors but also repairing them. Some embodiments taught herein provide a technical advantage of detecting and repairing errors in strings that contain both syntactic substrings and semantic substrings. Some embodiments taught herein provide a technical advantage of detecting and repairing errors in a fully unsupervised fashion (i.e., without the need for further user input) and some embodiments also incorporate execution information from any existing programs that read the data the embodiment is trying to clean.

In some embodiments, a string error mitigation approach is based on automatically learning regular-expression-based patterns that characterize a large fraction of values in a column or other set of string data values. An underlying assumption is that most values in the column (for example) are not data errors, and so a pattern that captures these values can then be used to identify values that are data errors; they are errors because they do not satisfy the pattern.

Some embodiments use these patterns not only to detect but also to repair errors, by automatically deriving edits to a string such that the edited string satisfies a given pattern. To do this, some embodiments exploit an equivalence between regular expressions and nondeterministic finite automata and present a dynamic programming approach to extracting a minimal sequence of edits for a given {string, pattern} pair.

Because strings can have both syntactic and semantic substrings, some embodiments utilize an LLM-based approach to integrating both categories of substrings into a pattern-based pipeline. Specifically, some embodiments use an LLM to identify and mask out substrings that are semantic based on a set of N semantic data types, where N is in the range from 1 to 1000, and optimally 10<N<100, and more optimally, 10<N<30. Each mask value (a.k.a. abstraction) is then treated as a special character in a regular expression learner. The embodiment then derives the edits as before, and finally replaces any mask values with an LLM-predicted replacement substring. In some embodiments, one or more string data values have been masked by the LLM, and afterward the embodiment learns the pattern. That is, the learned pattern may itself include mask values.

In particular, an approach to deriving edit sequences in some embodiments incorporates "abstract edits" (a.k.a. "abstractions" or "masks"), for which a final edit is undetermined at the pattern-matching phase. For example, a pattern may induce a digit to be inserted into a string, however, there is no further constraint on which particular digit 0 through 9 to insert; this insertion is an example of concretizing the abstraction. To resolve this ambiguity, some embodiments utilize a learning-based approach to deriving constraints that relate these abstract decisions (e.g., character classes or string disjunctions) in a pattern to the non-error data in the original column. Specifically, some embodiments extract features from non-error data and use this to predict the particular concretization decision made for a specific abstract portion of the pattern. Some embodiments then use this predictor as a constraint when deciding the concrete edit in an edit sequence with abstract edit actions. "Concretize" and "reconcretize" are used interchangeably herein.

Some embodiments can derive multiple possible repair candidates for a given data error, as there may be multiple patterns learned for non-error data, and therefore some embodiments utilize a heuristic ranker to sort string repair candidates. One such ranker includes a weighted linear function of one or more basic properties such as: a string edit distance between a data error and a suggested repair, a count of alphanumeric edit operations, a string edit distance of a repair value to a closest value in the column or other set, and a fraction of the column or other set that matches a pattern used to derive the repair candidate.

Not all string data will necessarily have a regularity that yields learned patterns to drive detection/repair. To mitigate this challenge, some embodiments also integrate information from one or more existing programs that were written to read target data. Specifically, assume a program takes a target cleaning column as an input, and assume this program is written to operate on each row independently and produce an output, and assume an embodiment can execute this program or obtain the program's execution results as pairs {input, program output from that input}. Some embodiments can take the execution outcome for each row, consider only rows that had a successful (e.g., non-exceptional) execution, and restrict pattern learning to these inputs. Next, the embodiments consider all rows with exceptional execution as data errors and use the learned patterns to derive repair candidates for these errors. Finally, the embodiments apply the repair suggestions and re-execute the programs. This execution-guided repair approach can identify errors that the fully unsupervised approach cannot.

Overall, internal evaluation results show that approaches taught herein yield higher precision and recall error detection and error repair on several benchmarks described herein.

Some embodiments perform fully unsupervised error detection on the set of string data values. This functionality has the technical benefit of not requiring users to provide further input to guide corrections on a value-by-value basis, which save user time and increases the range of times at which corrections can be performed.

Some but not necessarily all strings contain one or more mask values, also referred to as masked substrings. In some embodiments, deriving one or more edits to repair a string which contains the mask value includes receiving a spelling correction from a language model. This functionality has the technical benefit of supporting spelling correction in natural languages that are not necessarily familiar to users, e.g., a data analyst working with data from multiple languages can obtain cleaned data even when the data analyst is not fluent in all of those languages. Some embodiments provide a correction which changes a semantic type of a corrected substring, e.g., determining that a string refers to a city where a country is expected, and correcting the string accordingly.

Some embodiments prompt a language module with a unitary prompt that includes multiple string data values of the set of string data values together in the unitary prompt. This functionality has the technical benefit of providing the language model with more context for learning the pattern(s) that pertain to the set of string data values, which tends to increase the range and accuracy of the learned patterns.

In some embodiments, a pattern learner includes a language model interface which upon execution by a processor set accesses a language model, a set of significant patterns is learned by the language model, and at least one significant pattern includes a masked substring which is based on a semantic data type. This functionality has the technical benefit of learning patterns for detecting syntactic errors in strings that contain semantic substrings.

Some embodiments execute a string dataset transformation program on string data values, thereby producing execution outcomes, and learn at least one regular-expression-based pattern based solely on string data values which are not associated with any negative execution outcome. This functionality has the technical benefit of learning patterns based on correct values, and of identifying incorrect values.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 130 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one or more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108.

Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, string error mitigation functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More About Systems

Figure 2:
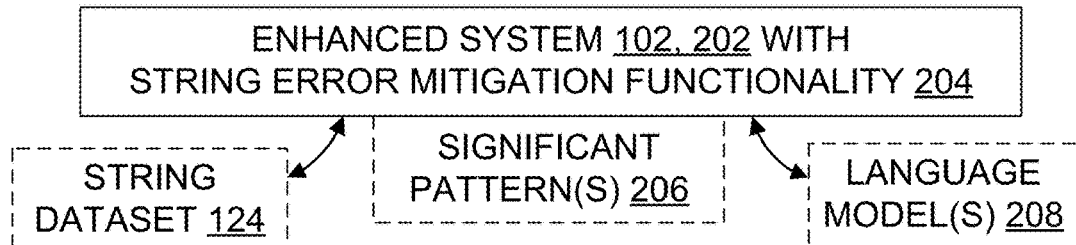
FIG. 2 is a block diagram illustrating an enhanced system configured with string error mitigation functionality.

FIG. 2 illustrates a computing system 102 configured by one or more of the string error mitigation enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
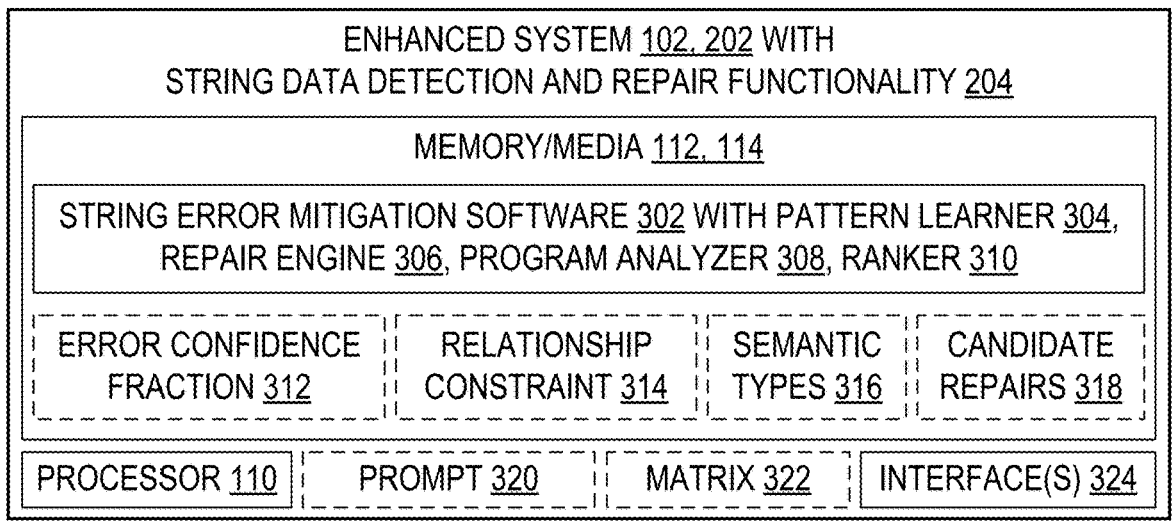
FIG. 3 is a block diagram illustrating aspects of a system enhanced with string error mitigation functionality, overlapping FIG. 2 but not identical in scope with FIG. 2.

FIG. 3 shows some aspects of some enhanced systems 202. This is not a comprehensive summary of all aspects of enhanced systems 202 or all aspects of string error mitigation functionality 204. Nor is it a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

Figure 4:
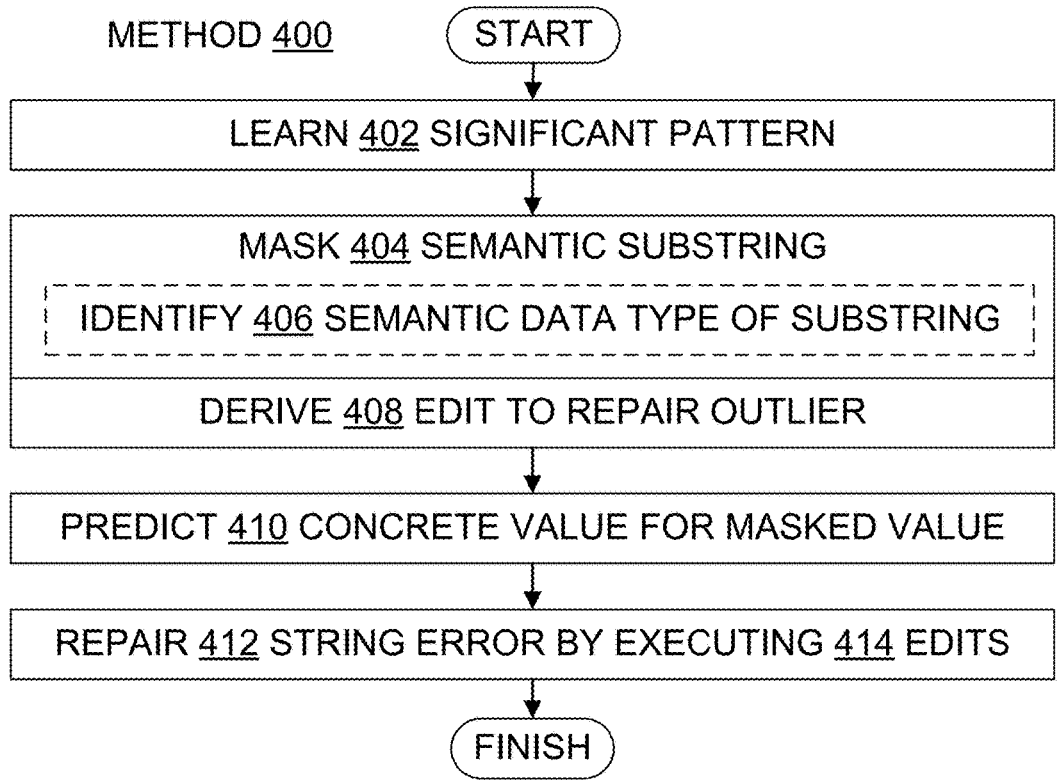
FIG. 4 is a flowchart illustrating steps in a string error mitigation method.
Figure 5:
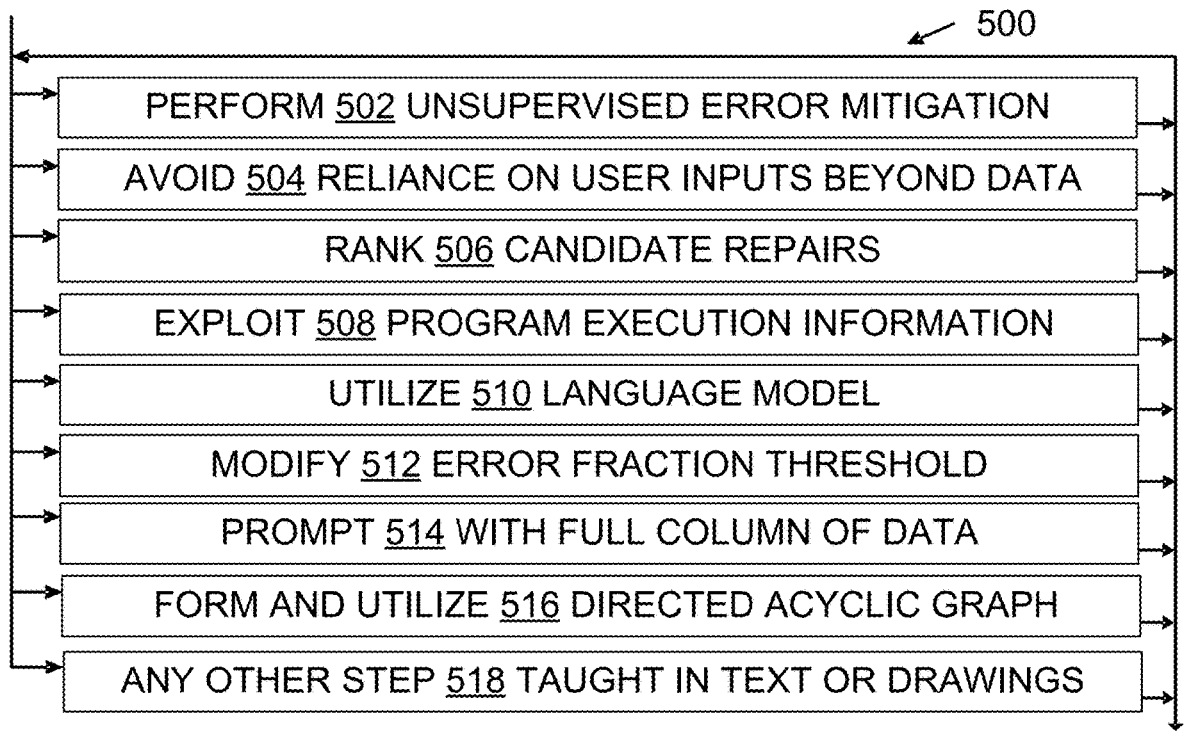
FIG. 5 is a flowchart further illustrating steps in some string error mitigation methods, and incorporating FIG. 4 and all steps taught in other Figures or in the text.

The other figures are also relevant to systems 202. FIGS. 4 and 5 illustrate methods of functionality 204 operation in systems 202. FIGS. 6 through 38 illustrate, e.g., operational aspects such as language model prompts, predicates, matrixes; operation examples; architectures; data flow; evaluation benchmarks, and evaluation results, for various embodiments of string error mitigation functionality 204.

In some embodiments, the enhanced system 202 is networked through an interface 324. In some, an interface 324 includes hardware such as network interface cards, software such as network stacks, APIs, or sockets, combination items such as network connections, or a combination thereof.

Some embodiments include a string error mitigation computing system 202 which includes: a digital memory 112, and a processor set 110 including at least one processor, the processor set in operable communication with the digital memory. The system 202 also includes a pattern learner interface 324 which upon execution by the processor set sends a set 124 of string data values to a pattern learner 304, and receives a set of one or more significant patterns 206 from the pattern learner, the set of significant patterns including a set of one or more regular expressions which collectively match a majority or other predefined fraction of the string data values, and which also collectively define at least one outlier string data value; and a repair engine interface 324 which upon execution by the processor set sends a repair engine 306 at least one significant pattern and at least one outlier string data value, and receives at least one edit program from the repair engine which upon edit program performance edits the outlier string data value to produce an edited outlier string data value which conforms to at least one significant pattern.

In some embodiments, the pattern learner includes a language model interface 324 which upon execution by the processor set accesses a language model 208, the set of significant patterns is learned 402 by the language model, and at least one significant pattern includes a masked substring which is based on a semantic data type 316. Masks are also referred to as abstractions.

Some embodiments include a ranker 310 which upon execution by the processor set ranks 506 candidate edit programs based on at least respective edit costs of the edit programs. Ranking is discussed, e.g., in Section 3, 3.5, and 5.4.2 of the discussion below under the heading Additional Observations.

Some embodiments include a cost matrix 322 which represents edit costs of a candidate edit program; and a move matrix 322 which represents edit actions of the candidate edit program. Matrixes are illustrated, e.g., in FIG. 11.

Some embodiments include a string data transformation program analyzer 308, which upon execution by the processor set analyzes actual execution outcomes or simulated execution of a string dataset transformation program, or both, and the system utilizes 508 a result of executing the transformation program analyzer as a basis of learning 402 at least one significant pattern. Execution-Guided Repair is discussed further, e.g., below under the heading Additional Observations.

Other system embodiments are also described herein, either directly or derivable as system versions of described processes or configured media, duly informed by the extensive discussion herein of computing hardware.

Although specific string error mitigation architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of string error mitigation functionality 204, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 4 and 5 each illustrate a family of methods 400 and 500 respectively, which are performed or assisted by some enhanced systems, such as some systems 202 or another string error mitigation functionality enhanced system as taught herein. Method family 400 is a proper subset of method family 500.

Some variations on FIG. 4 exclude masking 404 and predicting 410, and some variations include ranking 506. These are merely examples of variations; as noted elsewhere, any operable combination of steps that are disclosed herein may be part of a given embodiment.

FIGS. 1-3, 9-13, and 31-38 illustrate string error mitigation system 202 architectures with implicit or explicit actions, e.g., ingesting data, forming regular expressions, comparing string data to a regular expression, learning a sematic data type, abstracting a substring, concretizing a substring, transitioning state, or otherwise processing data 118, in which the data 118 includes, e.g., strings, patterns, edit programs (a.k.a. repair programs or repairs), matrices, language model prompts, and language model output, among other examples disclosed herein. Substrings are often, but not always proper, i.e., a proper substring is part but not all of a string that contains the substring.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in a file name to identify a dataset 124 to the system 202. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 5. FIG. 5 is a supplement to the textual examples of embodiments provided herein and the textual descriptions of embodiments provided herein. In the event of any alleged inconsistency, lack of clarity, or excessive breadth due to an aspect or interpretation of FIG. 5, the text of this disclosure shall prevail over that aspect or interpretation of FIG. 5.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 500 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 5 to be non-operable, the sequence S is not within the scope of any claim. Any assertion otherwise is contrary to the present disclosure.

Some embodiments provide or utilize a string error mitigation method 500 performed by a computing system 202. In this discussion and generally elsewhere herein, "method" is used in the legal sense and "process" is used in the computer science sense. This example method includes at least the following: an AI-based regular expression learner 304 learning 402 a regular-expression-based pattern that characterizes at least a predefined fraction of a set 124 of string data values; an AI-based semantic substring masker 208 identifying 406, and masking out 404 with a mask value, a substring based on a predefined set of semantic data types 316; the AI-based regular expression learner treating the mask value as a placeholder character (i.e., as a syntactic unit for pattern-matching purposes but one that is subject to later concretization, unlike particular alphanumeric values which are already concrete); the computing system deriving 408 one or more edits to repair a string which contains the mask value; an AI-based value predictor predicting 410 a replacement substring; and the computing system replacing (concretizing) the mask value by the replacement substring.

In some embodiments, the method performs 502 fully unsupervised error detection on the set of string data values. In some embodiments, the method performs 502 fully unsupervised error correction (a.k.a. repair) on the set of string data values.

In some embodiments, the regular-expression-based pattern 206 learned 402 by the AI-based regular expression learner characterizes at least half of the set of string data values.

In some embodiments, wherein a full performance of the method is performed without reliance 504 during the full performance on any user interaction during the full performance as a source of: a constraint, an example, or an annotation. This is an example of what occurs (or more precisely, fails to occur) during a fully unsupervised performance of the method.

In some embodiments, the method includes getting program execution information of a program which lists at least a string as an input to the program, the getting is performed without executing the program, and exploiting 508 at least a portion of the program execution information for error detection or error correction or both.

That is, some embodiments derive program execution information from a program without executing the program. For example, suppose a code snippet includes the fragment value.split (",") [0] (meaning, split a value on comma to produce a list of substrings and return the first substring in the list). Some embodiments infer from this snippet that at least some correct values contain a comma, and potentially contain two or more commas. Therefore, actual values that contain one or more enclosed commas are permitted in the pattern learner 304 training set, and indeed, the training set is deemed incomplete by some embodiments unless such data is present.

As another example, suppose a code snippet includes a function that parses an integer. Some embodiments infer from this snippet that a decimal point would lead to an execution exception (a.k.a. failed execution), and therefore actual values that contain a decimal point are excluded from the set of values that are used to train the pattern learner 304.

Some embodiments use parsing, static analysis, pattern matching, or other tools and techniques to determine that input values will contain a comma, or will parse an integer, etc., to avoid an exceptional execution outcome. More generally, literals, regular expressions, and other properties (a.k.a. patterns in data) are inferred from some programs without executing those programs. These inferred patterns are also examples of program execution information, even though they are not outcomes of actual program execution.

Some embodiments use inferred program execution information during detection or repair or both, e.g., to include or exclude actual data values as a basis of learned regular expressions. An embodiment's ability to extract this information statically (that is, without execution of the program from which the information is inferred) provides one or more advantages. One benefit is that some user programs have other errors that make them impossible to run without additional intervention, but execution information useful for error mitigation can nonetheless be gleaned from them. Another benefit is cost reduction, because running programs is sometimes expensive (particularly over large datasets) and can lead to both increased cost of goods sold and bad user experience.

Some embodiments exclude inference of valid string patterns based on portions of programs which the embodiment determines are seeking incorrect or abnormal values, e.g., functions which are inferred to perform upon execution a data cleaning operation, e.g., to remove unwanted hyphens from data. For instance, from a macro to search "-" and replace it with something else (possibly with no character), some embodiments infer that data values containing "-" would cause an exceptional execution outcome of another program. On the other hand, the replacement character, if not null, is inferred to be part of a valid string.

In some embodiments, the method includes learning a relationship 314 between a non-error value and a significant pattern, and using the relationship as a constraint when predicting 410 a concrete value in the replacement substring. More generally, a predicted value is used for mask replacement ins some scenarios but is also used in some scenarios for other character class decisions throughout a repaired string. This and other aspects of concretizing are discussed further, e.g., in Section 3.5 below under the heading Additional Observations.

In some embodiments, the method includes ranking 506 a set of candidate repairs. Ranking is discussed, e.g., in Section 3, 3.5, and 5.4.2 of the discussion below under the heading Additional Observations.

In some embodiments, the method includes exploiting 508 outcome information from execution of a string dataset transformation program which received at least part of the set of string data values as input, the exploiting including: learning 402 at least one non-negative-outcome-based pattern 206 which is based solely on string data values which are not associated with any negative outcome from execution of the string dataset transformation program; and utilizing a learned non-negative-outcome-based pattern to perform string repair. Execution-Guided Repair is discussed further, e.g., below under the heading Additional Observations.

In some embodiments, the method includes submitting a set of one or more prompts 320 to a language model 208, the set of one or more prompts including: an identification of a semantic type in string data as being a sematic type (e.g., FIG. 7 Semantic Types); an example with a non-masked example data portion and a corresponding masked example data portion (e.g., FIG. 7 Examples); and an inference request with a non-masked inference data portion and a request for a corresponding masked inference data portion (e.g., FIG. 7 Inference).

In some embodiments, the method includes modifying 512 a threshold which specifies the predefined fraction of the set of string data values. Modification 512 of a threshold denoted delta is part of Section 3.1 of the discussion below under the heading Additional Observations.

In some embodiments, deriving 408 one or more edits to repair a string which contains the mask value includes receiving a spelling correction from a language model 208. For example, in FIGS. 9 and 10, an embodiment correctly repairs a masked value "usa" to "US". Some embodiments provide a correction which changes a semantic type of a corrected substring, e.g., determining that a string refers to a city (e.g., "Paris") where a country is expected, and correcting the string accordingly (in this example, to "France"). This may be performed, e.g., by a language model 208 which has been trained to recognize semantic types 316 and trained with examples according to those types, e.g., maps or articles about countries and their cities.

In some embodiments, the method includes prompting 514 a language module with a "unitary prompt" that includes multiple string data values of the set of string data values together in the unitary prompt. Successive prompts 320 which present the model with respective sections of a large set as a batch, due to limitations of the model 208 on the number of tokens per prompt (e.g., 4 k tokens for GPT-3.5), are also collectively deemed a unitary prompt.

In some embodiments, the method 500 includes converting a regular-expression-based pattern 206 into a non-deterministic finite state automaton, forming a directed acyclic graph by at least partially unrolling the non-deterministic finite state automaton, and utilizing the directed acyclic graph for calculating an edit cost of a candidate repair of a string data value of the set of string data values. This is illustrated, e.g., in FIG. 11. In some scenarios, unrolling is not performed.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as regular expressions and other patterns 206, semantic type 316 listings, edit programs 318, matrixes 322, directed acyclic graphs, language model prompts 320, and masks 404, in the form of data 118 and instructions 116, read from a removable storage medium 114 and/or another source such as a network connection, to form a configured storage medium. The configured storage medium 112 is capable of causing a computer system 202 to perform technical process steps for providing or utilizing string error mitigation functionality 204 as disclosed herein. The Figures thus help illustrate configured storage media embodiments and process (a.k.a. method) embodiments, as well as system and process embodiments. In particular, any of the method steps illustrated in FIGS. 4, 5, 9, 10, 11, 20, 21, 25-29, 31-38, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a string error mitigation method 500. This method 500 includes: learning 402 a regular-expression-based pattern that characterizes at least a predefined fraction of a set of string data values; identifying 406, and masking out 404 with a mask value, a substring based on a predefined set of semantic data types; deriving 408 one or more edits to repair a string which contains the mask value; and replacing 412 the mask value by a replacement substring which conforms to the regular-expression-based pattern.

In some embodiments, the method includes executing a string dataset transformation program on string data values (part of exploiting 508), thereby producing execution outcomes, and learning 402 (also part of exploiting 508 in this scenario) at least one regular-expression-based pattern based solely on string data values which are not associated with any negative execution outcome.

In some embodiments, the method includes detecting 518 and repairing 412 syntactic errors and semantic errors in the string data values.

Additional Observations

Additional support for the discussion of string error mitigation functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

DataVinci™ Technology of Learning Syntactic and Semantic String Repairs

String data is common in real-world datasets: 67.6% of values in a sample of 1.8 million real Excel® spreadsheets from the web were represented as text (mark of Microsoft Corporation). Systems that successfully clean such string data can provide a significant technical benefit. Some approaches have been limited to error detection or require that a user provide annotations, examples, or constraints to fix the errors. Furthermore, some approaches have focused only on syntactic errors or only on semantic errors in strings, thereby ignoring aspects of strings that contain both syntactic and semantic substrings.

By contrast, some embodiments of teachings presented herein, which include some denoted as DataVinci™ systems, provide a fully unsupervised string data error detection and repair system (mark of Microsoft Corporation in connection herein with string error mitigation). The DataVinci™ string data error mitigation technology discussed herein is not to be confused with a DataVinci data and tack scheduler for mobile ad-hoc computing environments.

Some embodiments of DataVinci™ functionality 204 learn regular-expression-based patterns that cover a majority or other predefined fraction of values in a column and report values that do not satisfy such patterns as data errors. Some embodiments of DataVinci™ functionality 204 can automatically derive edits to a data error based on the majority patterns and constraints learned over other columns without further user interaction. To handle strings with both syntactic and semantic substrings, some embodiments of DataVinci™ functionality 204 use a large language model (LLM) 208 to abstract and reconcretize portions of strings that are semantic in conjunctions with learning majority patterns and deriving edits.

Not all data 124 can result in majority patterns 206. However, some embodiments of DataVinci™ functionality 204 leverage 508 execution information from a program which reads the target data, in order to identify and correct data errors that would not otherwise be identified. Internal testing of a DataVinci™ functionality 204 implementation outperformed seven baselines on both error detection and repair when evaluated on four existing and new benchmarks.

1.0 INTRODUCTION. Errors in tabular data 124, such as inconsistent or corrupted values, are not unusual and can result in incorrect computations, invalid conclusions, and downstream data pipeline failures. Such data errors can stem from a variety of sources, including manual data entry, data integration, and faulty computations. Even in professional settings, such as financial institutions and consulting firms, up to 24% of spreadsheets can have one or more mistakes, including data errors.

FIG. 6 shows some examples of errors found in online Wikipedia® tables (mark of Wikimedia Foundation, Inc.), and FIG. 8 shows some examples of errors found in public Excel® spreadsheets (mark of Microsoft Corporation). The data errors in each column are highlighted. There is a mix of both syntactic errors (like 03.45) and semantic data errors (like Birminxham) found in real tables. In a sample of 1.8 million Excel® spreadsheets from the web, 67.6% of values are represented as text (compared to numeric or datetime values). Some approaches relevant to string data focused primarily on detecting errors but not repairing them, or required users to provide (partial) annotations or constraints to drive a semi-supervised detection/repair procedure, or relied on a limited rule-learning approach.

Furthermore, effective string cleaning optimally handles errors in columns where values contain both syntactic and semantic substrings (although columns are used as examples, teachings herein are not limited to vertical, columnar, horizontal, tabular, or linear data organization or layout of data 124). For example, given a column with three values [(NY, (Boston), (Miami)] where the pattern is both semantic (city names) and syntactic (parenthesized values), an optimal repair system would report the first entry as a data error and suggest (New York) as the repaired value. However, rule-based and external knowledge-based systems only tackle the syntactic issue or the semantic issue, respectively, but not the combination of these issues.

Some embodiments of functionality 204 are denoted herein by the mark DataVinci™ and include a fully automated error detection and resolution system or method for string columns in tabular data 124. Some DataVinci™ technology handles qualitative string errors in a column, such as missing string values, inconsistent formats, or misspellings in strings. In contrast to other work, some embodiments of DataVinci™ technology not only detect data errors in strings but also suggest repairs. Some embodiments of DataVinci™ functionality 204 detect and repair errors in strings that contain or consist of both syntactic substrings and semantic substrings, unlike work that was tailored to either category separately. Some embodiments of DataVinci™ functionality 204 can perform detection and repair in a fully unsupervised manner, without requiring 504 user inputs such as constraints, examples, or annotations.

Error Detection. To carry out fully unsupervised error detection on a string column, some DataVinci™ technology exploits regularity in string data, and reports as data errors those values that do not satisfy patterns 206 associated with a (configurable) large fraction of the column's values. In contrast to some pattern-based work, some DataVinci™ technology uses an LLM 208 to identify 406 and mask 404 semantic substrings, allowing a regular-expression-based pattern learner 304 to capture strings having both syntactic and semantic substrings.

Error Repair. While some string repair systems require that the user provide examples, annotations, or constraints, some DataVinci™ technology suggests data repairs without any additional input, by comparing the data error to regular-expression-based patterns (a.k.a. significant patterns) 206 that are associated with a large fraction of values. Specifically, some DataVinci™ technology generates candidate repairs 318 by deriving a minimal set of edits to an erroneous value that lead to satisfying a significant pattern. Because these edits may contain elements such as character classes to be concretized, some DataVinci™ technology learns relationships between non-error values and significant regular expressions and uses these as constraints when predicting 410 the concrete values. After these edits are applied 414, any semantic mask values remaining are concretized by replacing them with concrete LLM-predicted substrings. Some DataVinci™ technology sorts the final set of candidate repairs based on a heuristic ranker.

Execution-Guided Repair. By flagging values that do not satisfy significant patterns as data errors, some DataVinci™ technology can mitigate false positives. However, real data does not always display such significant patterns 206. For example, consider a column named col1 with values [c-1, c-2, c3, c4]. Without further information, a pattern learner 304 would identify two patterns, one to cover the first two entries and a second to cover the last two entries. Without further information, it is not possible to identify any of these entries as a data error under a majority assumption.

However, executing 508 a user-written spreadsheet implicit validation formula=SEARCH ("-", [@col1])), which searches for the "-" in a string, on the first two values will yield a valid result, but on the last two values will result in an exception. This execution provides a strong program analyzer 308 signal that the last two values are data errors with respect to this formula, under an assumption that the search is a search for correct values, not a search for errors. In a variation, interaction behavior following the execution, such as copying and pasting the values that contain "-", indicates the values are correct. In an alternate scenario, interaction behavior such as deleting the "-", would indicate that the correct values are the ones without the "-".

In these and other scenarios, some DataVinci™ technology exploits 508 data tool execution information to provide suggested repairs 318. First, in the scenarios where execution indicates the values with "-" are correct, this DataVinci™ technology 202 flags the last two values as data errors due to their exceptional execution. Second, this DataVinci™ technology learns 402 a regular expression exclusively over the two successful input values (the one's with "-"). Third, this DataVinci™ technology applies the pattern-based repair procedure previously described to the failing inputs, producing 414 the expected repairs c-3 and c-4 by inserting the missing "-" characters.

Internal testing was performed to evaluate some DataVinci™ technology on an existing benchmark (Wikipedia® web tables) and three other benchmarks (a collection of real-world Excel® tables, synthetically corrupted Excel® tables, and Excel® formulas and their input data). DataVinci™ technology performance compared favorably to seven baselines, which included five existing error detection/repair systems, one LLM-based baseline, and one small transformer-based model. In addition, an evaluation augmented detection-only systems with a GPT-3.5 error repair module. Jointly these internal evaluation activities cover a variety of existing approaches from the data management community or reasonable alternatives.

Evaluation results showed that DataVinci™ technology's fully unsupervised pattern-based detection and repair approach led to higher precision detection (+1.6 to +8.7 points than next best), higher recall detection (+3.6 than next best), and higher precision repairs (+1.6 to +12.2 points than next best). Evaluation results also showed that removing the LLM-based abstraction and concretization approach that supports repairing mixed syntactic and semantic strings reduced repair precision and recall (−3.8 and −6 points, respectively). Evaluation results also showed that applying DataVinci™ technology's execution-guided repair to the benchmark of Excel® formulas raised formula-level execution success rates to 54% (single-column inputs) and 47.8% (multi-column inputs) compared to 43.2% and 35.7% for DataVinci™ technology without execution-guided repair, and substantially outperformed the next best non-DataVinci® technology baseline.

In summary, some DataVinci® technology utilizes or provides a pattern-based approach to detect and repair errors in strings with both syntactic and semantic substrings. Some DataVinci® technology detects data errors and suggests repairs in a fully unsupervised fashion. Some DataVinci® technology utilizes or provides execution-guided repair for data cleaning, in which an embodiment executes an existing program that depends on the target column, uses the resulting execution success information to learn patterns, and reduces the associated program failures by applying suggested repairs. An extensive internal evaluation on multiple datasets from different domains and against multiple existing systems produced results showing that some embodiments outperform other string error detection and repair approaches.

2 PROBLEM STATEMENT. A target domain of string data errors is defined as follows.

Definition 2.1 (String Data Error). Let T be a table, consisting of a collection of m columns $\{c_1, \ldots, c_m\}$, each with n values. Let $c_i$ be a string column consisting of observed values $\{v_1, \ldots, v_n\}$, where $v_j$ is a string value. For each $v_j$, let $v^*_j$ (v-star-j) be the latent clean value. If $v_j \neq v^*_j$, then $v_j$ is a string data error.

A goal of a string repair system is not only to identify such string errors, but also to provide repaired values.

Definition 2.2 (String Error Repair). Let v be a string value with a data error. Let v̂ (v-hat) be a string value produced by a data repair system, given v and the table T. Then v is a candidate string error repair. If v=v*, it is a successful string error repair.

Because the space of possible errors and repairs described above can be infinite (e.g., one can always extend the string with new characters), some embodiments reflect a problem focus on pattern-based regular error detection and repair in string values. Section 3.2 of the present discussion shows that simple adaptations to this framing allow performance of pattern-based semantic repairs.

Definition 2.3 (Regular string column and regular errors). Let Li be a pre-defined latent regular language that characterizes latent values in column ci, such that ∀ vj ∈ci: v*j E Li. A value vj is a regular error, if vj ∉Li.

Definition 2.4 (Regular repair). Let v be a regular string error. Then v° is a candidate regular string repair, if v E Li. If v=v*, it is a successful regular string repair.

A goal of some embodiments is to automatically learn a representation for Li, and use this representation along with table T to produce repair candidates for every v∈Li. Note that a direct consequence of Definition 2.3 is that a string data error which is in the latent regular language, but is not the right value, will not be detectable in this setting. This is reflected in some embodiments. Despite this restriction, some embodiments achieved high performance on real benchmark tasks.

3 Datavinci™ String Error Mitigation Technology.

Figure 9:
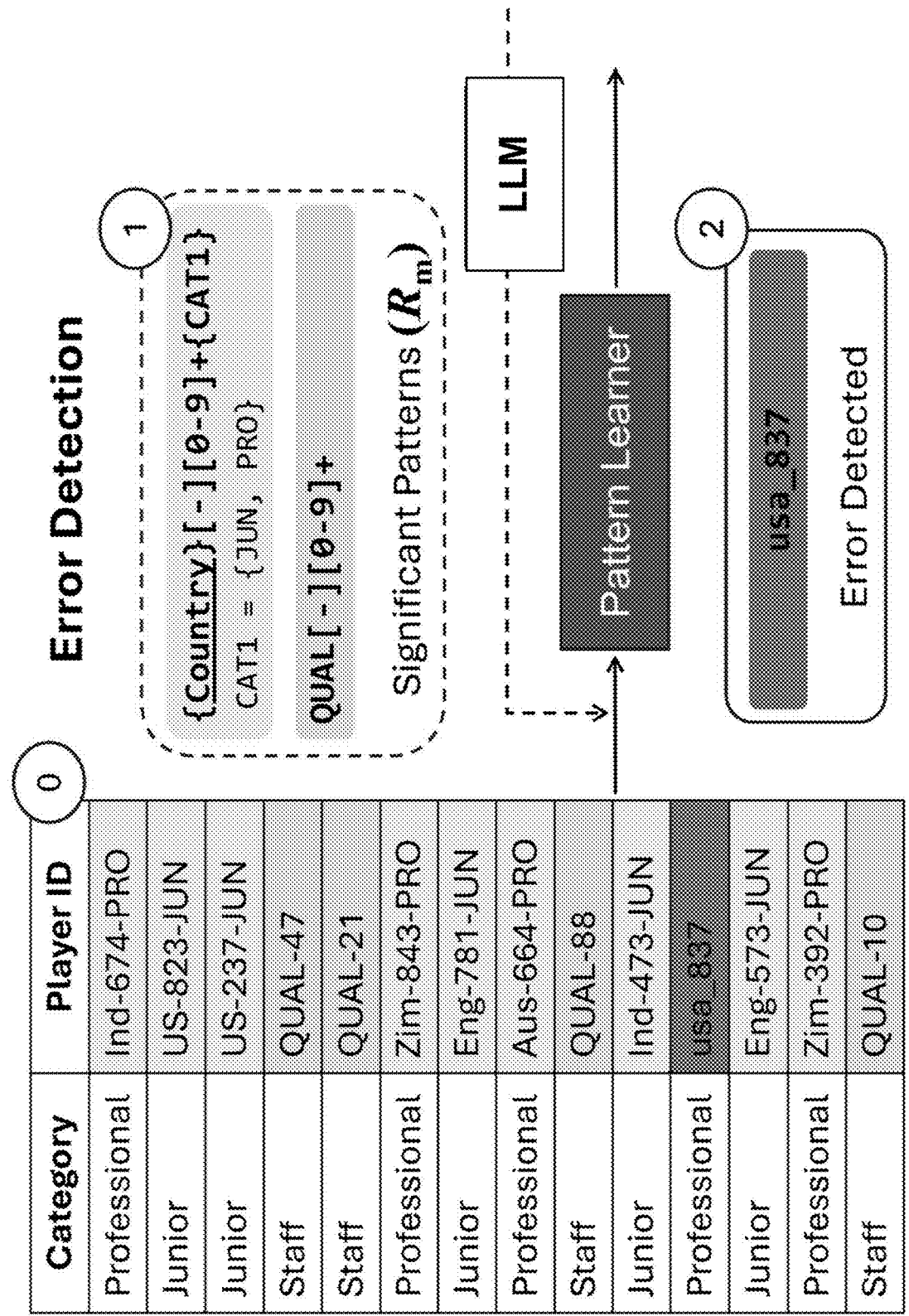
Figure 10:
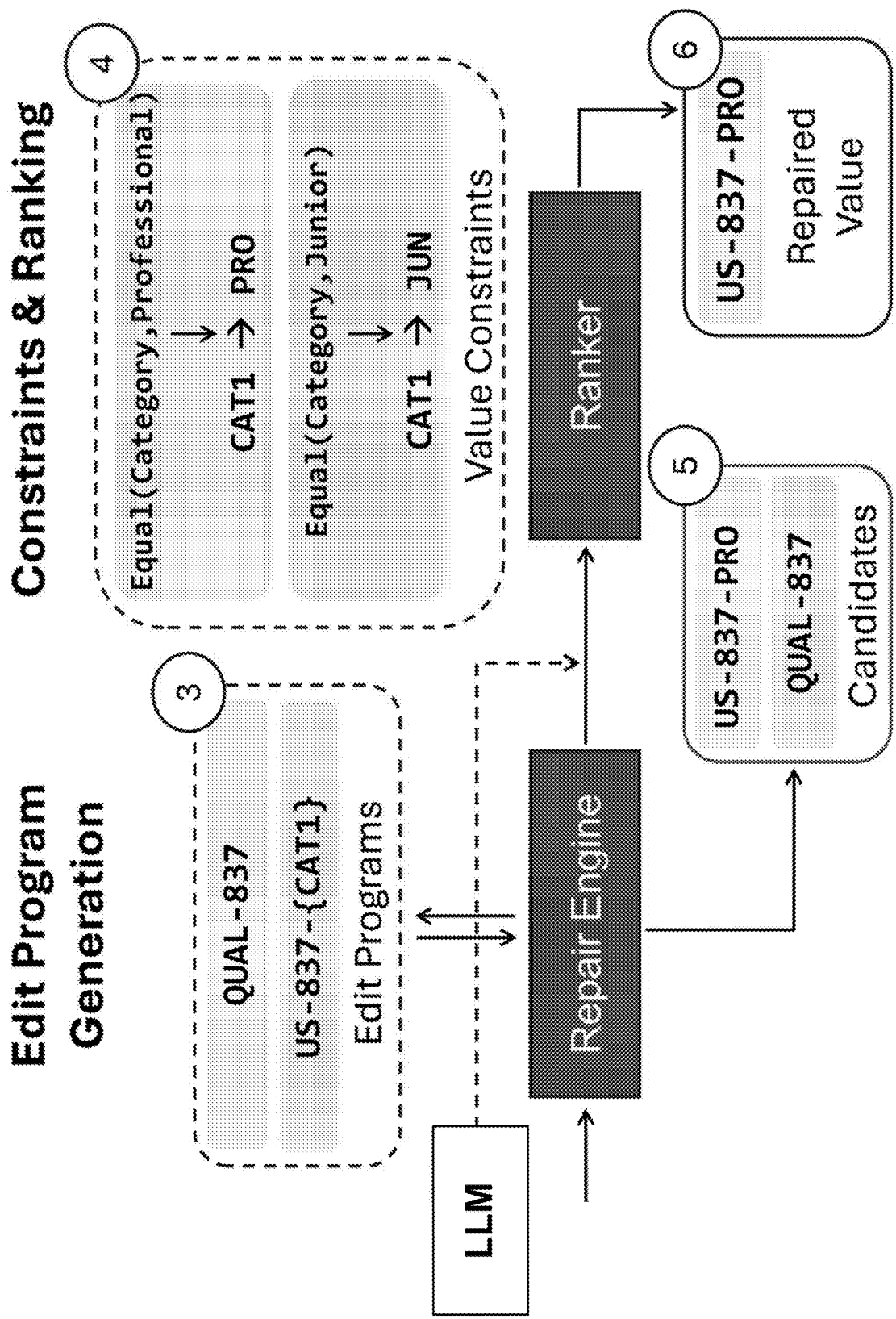
Figures 24, 25:
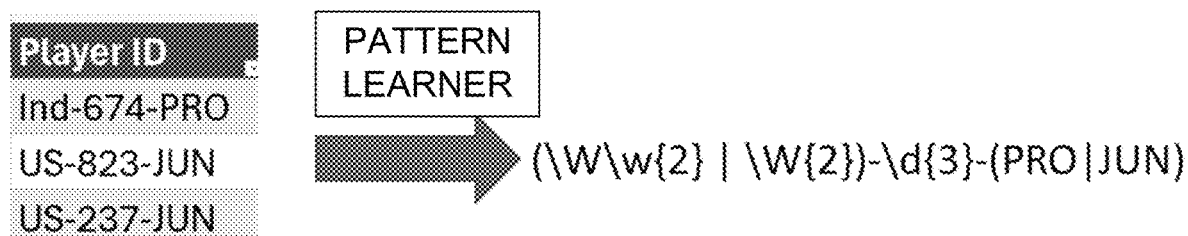
FIG. 24 is a diagram showing example data and illustrating regularity in string data usable for detecting errors, with a first portion of the data selected for discussion.
FIG. 25 is a diagram illustrating use of a pattern learner on the first selected portion of FIG. 24 data, and showing a representation of a first learned pattern.
Figure 26:
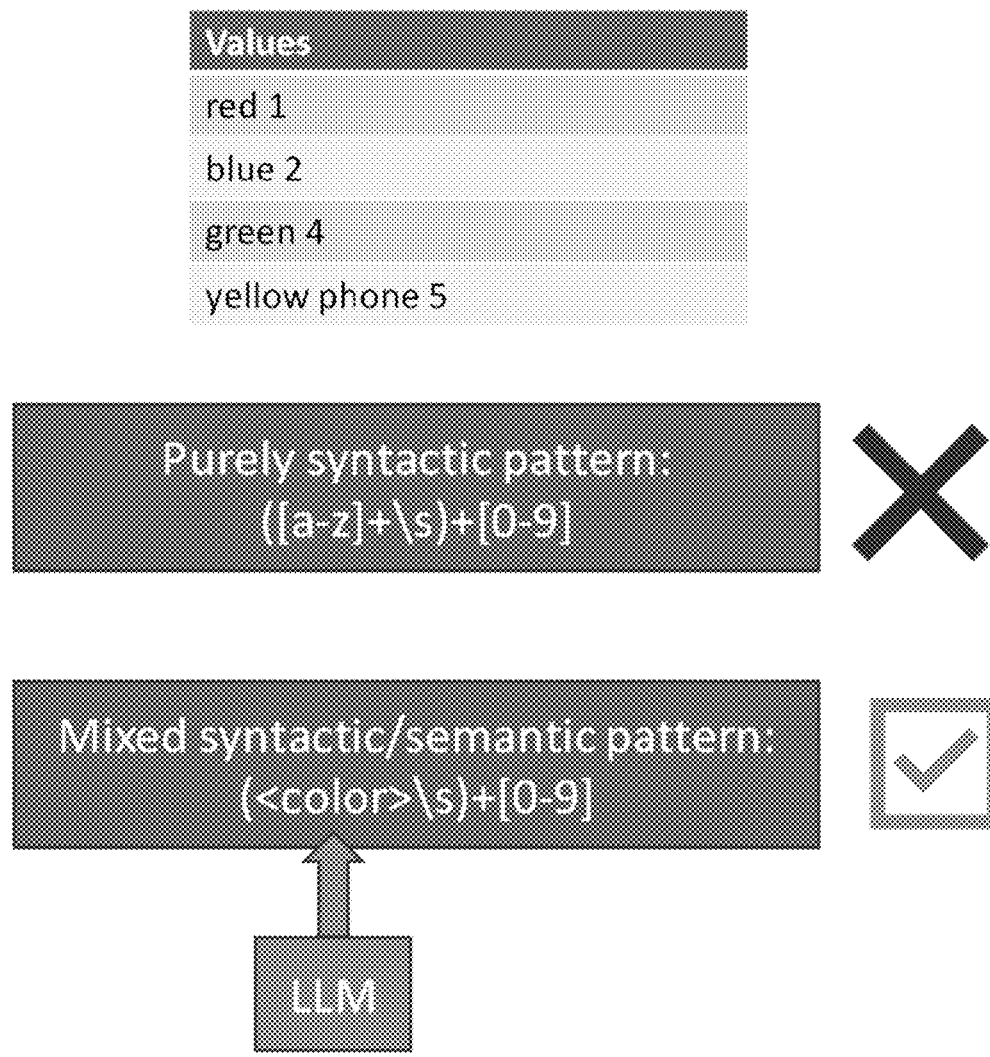
FIG. 26 is a diagram showing example data different than FIG. 24 and illustrating use of a language model to handle semantic substrings.
Figure 27:
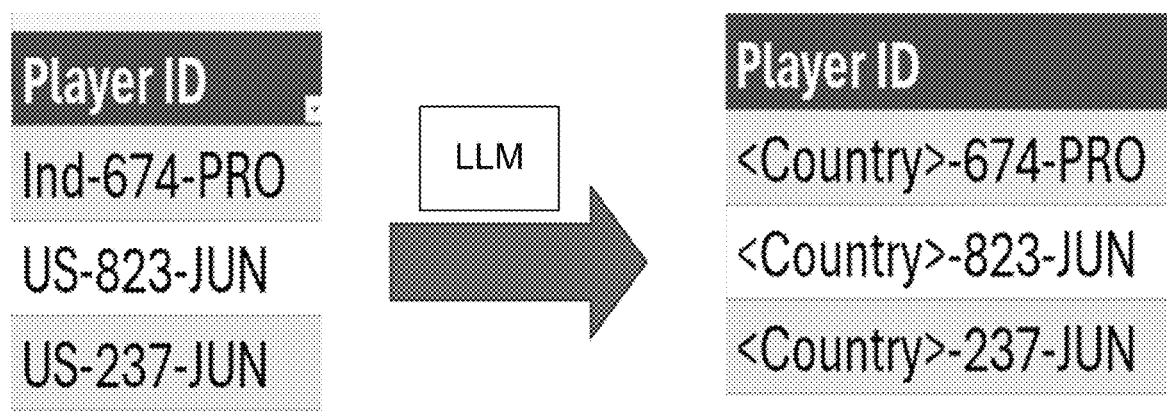
FIG. 27 is a diagram continuing the example started in FIG. 24 and showing masked semantic substrings, also referred to as abstracted substrings.
Figures 28, 29:
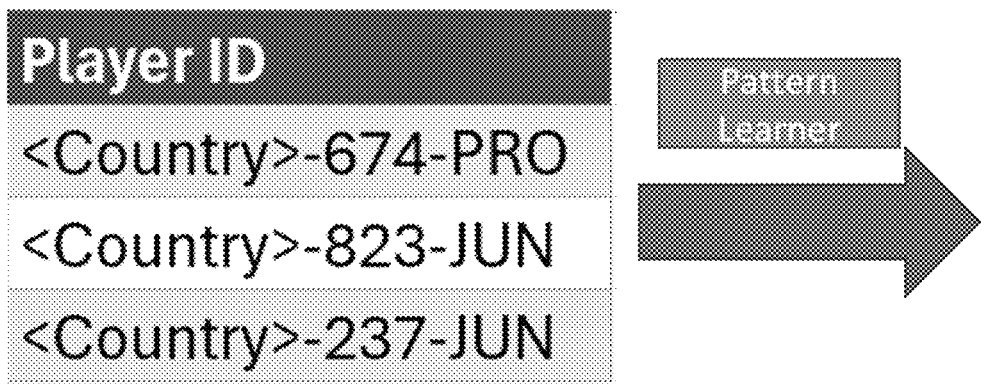
FIG. 28 is a diagram continuing the example started in FIG. 24 and showing a second pattern learned from the data containing masked semantic substrings shown in FIG. 27.
FIG. 29 is a diagram illustrating use of a pattern learner on a second selected portion of FIG. 24 data, and showing a representation of a third learned pattern.

FIGS. 9 and 10 jointly show a schematic overview and operation example of some DataVinci™ string error mitigation technology 202. Circled 0 denotes an example input table. As indicated at circled 1, this DataVinci™ technology learns significant patterns, which account for both syntactic and semantic substrings (using the LLM), for the Player ID column of the example. The values satisfying each pattern are shown in a highlighting corresponding to the pattern, including light highlighting (e.g., Ind-674-PRO, US-823-JUN, US-237-JUN, Zim-843-PRO, etc.), medium highlighting (QUAL-47, QUAL-21, QUAL-88, QUAL-10), and dark highlighting (usa_837). Underlined pattern elements (e.g., Country) correspond to LLM-abstracted semantic substrings.

As indicated at circled 2, significant patterns are used to detect outliers. The outlier value usa_837 is detected as an error because it does not satisfy a significant pattern. As indicated at circled 3, edit programs 318 for the outlier are learned by deriving edits to the string that will satisfy a significant pattern. As indicated at circled 4, constraints are generated to concretize abstraction actions in edit programs. Here, the constraint between an abstraction {CAT1} and the Category column is learned. Applying these value constraints produces the candidate repairs 318, as indicated at circled 5. The heuristic ranker 310 sorts candidates, and as indicated at circled 6 the top ranked candidate is suggested to the user.

That is, this example starts with a table that contains a string column to clean (Player ID), which is indicated at circled 0. The illustrated DataVinci™ technology performs error detection by learning 402 a set of significant patterns, indicated at circled 1, using an off-the-shelf pattern learner. To support patterns 206 that represent both syntactic substrings and semantic substrings, this example DataVinci™ technology uses an appropriately prompted LLM 208 to replace semantic substrings with a mask 404. Values that do not satisfy any significant pattern are flagged as data errors, as indicated at circled 2, and are provided to the repair engine 306. The repair engine produces edit programs by deriving edits for a data error to satisfy a significant pattern.

These edit programs sometimes have abstract edit actions, such as deciding what character in a class or substring in a disjunction (e.g., CAT1) to choose, as indicated at circled 3. The illustrated DataVinci™ technology 204 resolves these choices by learning value constraints over non-error data, indicated at circled 4, and applying these constraints to the abstract edit actions to produce full repair candidates, indicated at circled 5. Because different significant patterns sometimes produce different repair suggestions, the illustrated DataVinci™ technology employs a heuristic ranker 310 to return the top suggestion, as indicated at circled 6. The following sections help describe these operational steps and mechanisms in detail.

3.1 Detecting Patterns and Errors.

In some embodiments, DataVinci™ technology uses a set of patterns 206 to describe the regular language that a column represents. Values that do not match any patterns, and thus are not accepted by the language, are marked as errors. Each pattern 206 is described by a regular expression over all characters encountered in a given dataset 124. This discussion uses regular expression notation, with the following character classes for: digits, cased and uncased letters, alphanumeric, spaces, alphanumeric with spaces, and a common recurring character class of [0, 1]. Given a column c, some implementations of DataVinci™ technology use a FlashProfile framework or other inductive synthesis framework to learn 402 up to k patterns R= {r1, . . . , rk} such that all values v in c are in the language jointly defined by these patterns LR=Union (Lrk). The FlashProfile framework supports disjunction (e.g., (cat|dog) matches "cat" and "dog") and quantification over groups (e.g., ([a-z].)+ matches one or more repetitions of a letter and a period). The FlashProfile framework balances the number of individual patterns with the generality (number of cells covered) of each pattern. These implementations of DataVinci™ technology use default FlashProfile framework parameters.

From these patterns 206, this DataVinci™ technology then selects the subset of patterns Rm & R that individually cover at least a fraction, denoted delta, of the values; these are referred to as significant patterns. The union of these significant patterns defines the language LRm=Union-over-k-in-m (Lrk). This DataVinci™ technology reports any value v e LRm as a data error. In some embodiments, the confidence required to report a value as an error is varied by changing 512 the threshold delta.

3.2 Semantic Abstractions.

To facilitate DataVinci™ technology repairs to perform both syntactic changes and semantic changes, like usa_837->US-837 in FIGS. 9 and 10 (where the substrings usa and US denote a country), using a syntactic repair engine, some embodiments perform a semantic abstraction on some values. In such an abstraction, substrings that denote a named concept x, like a city or a color, are replaced with a mask token mx.

Example 1. Consider a column with values [red 1, dark green 2, blue phone 3]. A syntax pattern that matches this column is ([a-z])+ [0-9]; this syntax pattern does not identify that "phone" should be removed. With knowledge about colors, a semantic abstraction of this column is [mc 1, mc 2, mc phone 3]. The significant pattern becomes mc [0-9] and "mc phone 3" is identified as an error.

One way of obtaining the semantic abstraction of a string is to maintain a dictionary of concepts. Although used in some embodiments, this does have potential drawbacks: some concepts are hard to exhaustively enumerate (like colors), spelling mistakes cannot be repaired without additional fuzzy matching (like "bleu" instead of "blue") and semantic concepts can be contextual ("red" can also refer to a movie).

Some embodiments of DataVinci™ technology leverage a large language model (LLM) to obtain 406, 404 the semantic abstraction. While abstracting, some embodiments also allow the LLM to provide suggestions for replacement strings that can be used to replace the mask in the final string. This allows the LLM to repair spelling mistakes, for example, in FIGS. 9 and 10, it correctly repairs the masked value usa to US.

To capture and implement the context of semantic concepts, some embodiments prompt 320 the model with a whole column at once. Long columns are processed in batches based on the maximum prompt length (e.g., 4$k$ tokens for GPT-3.5). Due to the repetitive nature of this task, long prompts did not deteriorate the quality of generations.

It is beneficial to mask 404 values at a suitable level of granularity. For example, values from a column [Q4-2002, Q3-2002, Q32001] are masked entirely as Quarter if given to the LLM without further restrictions. This masking would prevent the last value from being repaired (Q32001→Q3-2001). To mask 404 values with a more optimal granularity, some embodiments only mask a set of predefined semantic categories 316. One semantic type detection approach by Sherlock provides a method to classify a column as one of seventy-eight popular semantic types, such as Name, Country, and Currency. However, various numbers of semantic types, and various choices of particular semantic types, are used by various embodiments. Some embodiments use the twenty most frequently occurring semantic types 316, which cover 99.2% of values with a detected semantic type, based on 25 K data columns from sampled Excel® data.

FIG. 3 summarizes a semantic abstraction prompt structure 320 utilized to perform semantic abstraction with the LLM. Some embodiments use few-shot prompting to teach the LLM or other language model both (1) to mask the substring s of semantic type t as {t(s)} and (2) that it is allowed to repair the masked values (e.g., {t (s')} where s' #s). For example, the masked version of "US-123" is "{country (US)}-123" and "u.k.-392" becomes "{country (UK)}-392". These are then transformed to "m1-123" and "m1-392" before learning patterns, and mask m1 is added to the alphabet for the regular expression learner.

3.3 Repairing Values with Edit Programs

Given a pattern rk∈Rm and a value v & Lrk, some DataVinci™ technology repairs v by learning 408 one or more edit programs e such that e (v) ∈rk, where e (v) denotes applying program e to value v. Let an edit action be a function that optionally deletes a character and optionally emits a given character. An edit program 318 is then a sequence program over edit actions, which when applied to value v, yields one candidate repair. The edit program is applied to a string by starting from the first character and applying each edit action on the current character and advancing to the next character in the string. An overview of edit actions over characters is shown in FIG. 12. Some variations omit substitute ( ) and some variations add swap ( ) at cost 2.

Example 2. Consider an edit program [M, S (2), I (.)] consisting of three steps. M represents match ( ) S represents substitute ( ) and I ( ) represents insert ( ) per FIG. 12. I (.) inserts a period. to the left of the current character. Notating the current character being looked at with an underscore, the string AAA3 is edited by edit program [M, S (2), I (.)] as follows: AAA3-(M) à AAA3-S(2) à A2A3-I (.) à A2.A3

Let e be an edit program that repairs value v∉Lr with respect to pattern r. Then e is minimal if there does not exist an edit program e' (v)∈Lr such that dist (e' (v), v)<dist (e (v), v), where dist is a string distance metric, e.g., the Levenshtein edit distance between strings, or another edit distance between strings. Given v∉Lrk, some DataVinci™ technology learns 408 minimal edit scripts e (v) E Lrk using dynamic programming (DP). The pattern rk is interpreted as a non-deterministic finite state automaton (NFA) where edges correspond to matching and consuming a single character.

An example of a pattern and its corresponding NFA is shown in FIG. 11. An erroneous value will end in a non-accepting state in the NFA where no further transitions can be taken. By changing the characters of the string as an embodiment traverses the string, edit actions allow the embodiment to follow new edges. These changes come at a cost, however, as illustrated in FIG. 12. Finding a minimal edit script then corresponds to finding a lowest cost path in the NFA, which is done through dynamic programming.

Example 3. Consider the example in FIG. 11. When processing the highlighted data error, after transitioning on the A edge, there are no more edges that an embodiment can follow. For a cost of 1, the embodiment can use an edit action I (3) to follow the [0-9] edge. There are two challenges to finding a lowest cost path: loops due to unbounded quantification, and transitioning on character classes and categories. For example, there are ten edit actions I (0) . . . . I (9) that allow following an edge [0-9].

To handle loops, some embodiments approximate the NFA for a given value v with a directed acyclic graph (DAG) Dv by unrolling loops up to depth ceil (len (v)/len (cycle)), where ceil ( ) denotes the ceiling function, len ( ) denotes the length function, and/denotes division. The length of a cycle is defined as the number of edges in the cycle. Some embodiments support nested cycles and follow the same unrolling procedure recursively for each nested loop. In practice, nested loops appeared to be rare in learned regular expressions during internal evaluation of some DataVinci™ technology implementations, in that less than 1% of regular expressions learned over 100,000 Excel® columns resulted in nested loops. FIG. 11 shows the NFA converted into a DAG by unrolling the loop twice and topologically sorting states. The loop was unrolled twice, as the length of the cycle is 3 and ceil (4/3)=2.

FIG. 11 illustrates operation of a DataVinci™ technology repair engine 306 on an example column. The significant regex learned for the column is (A [0-9].)+) which is used to identify the outlier (AAA3), highlighted in the Code column. The regex is converted to an NFA with the starting and accepting states shown in no highlighting and dark highlighting, respectively, and with transition symbols over the edges. The NFA is then unrolled to a DAG for the outlier. FIG. 11 shows a computed cost matrix 322 and a computed moves matrix 322, and denotes one optimal repair script path 318 in them, with arrows starting at the bottom right corner in each matrix.

To match character classes and disjunctions, some embodiments first learn abstract edit programs, which have edit actions that emit a character class or a value from a disjunction. Two examples of abstract edit actions are S (0-9) (see FIG. 11) and I (CAT|PRO) (see FIGS. 9 and 10). After the minimal abstract edit program is obtained, abstract edit actions are concretized by choosing one of the characters in the character class or one of the strings in the category. Concretization is detailed in Section 3.4 of the present discussion. It does not influence how minimal (abstract) edit programs are learned.

Let cost (i, j) be the cost of transitioning on edge j after having consumed i characters in the string, and let move (i, j) be the edit action required to do so. In the previous example, cost (1, j2)=1, as a result of the insertion action. Nodes can have multiple incoming edges; p (j) denotes incoming edges in the node where edge j starts. The cost of transitioning on each edge while traversing the string is recursively defined as:

$$\mathrm{COST}(i, j) = \min \begin{cases} \min_{j' \in p(j)} \mathrm{COST}(i, j') + 1 & (I) \\ \min_{j' \in p(j)} \mathrm{COST}(i-1, j') + [s[i] \neq l(j)] & (M \text{ or } S) \\ \mathrm{COST}(i-1, j) + 1 & (D) \end{cases}$$

with I (j) denoting the label of edge j, and using [a #b] Iverson bracket notation, which evaluates to 1 if a #b else 0. The associated moves are shown on the right of each case for calculating cost (i, j).

Example 4. In FIG. 11, one arrives at cost (2, j2) (i.e., cost of traversing j2 after consuming two characters) through three paths. One can move with cost (1, j1) to the new state by substituting the second A with a digit (S (0-9) at cost 1), by inserting a digit and deleting the second A (I (0-9), D with a cost 2), or by deleting the second A and inserting a digit (D, I (0-9) with a cost 2). Because substitution had the lowest cost (1), cost (2, j2)=1 and moves (2, j2)=S (0-9). The correctness of the DP algorithm can be proven through extension of string edit-distance. The time complexity of the algorithm is $O(m^2 n)$ with m being the number of edges in the DAG and n being the number of characters in the erroneous string v. The space complexity is O (mn) as the algorithm only stores the cost matrix and the moves matrix.

3.4 Concretizing Edit Programs

Some embodiments of DataVinci™ technology 204 learn decision trees to predict concrete values for each character class (which are disjunctions over a set of characters) and each string disjunction in the pattern rf that induced an edit program. These learned rules are referred to as concretization constraints. By construction, every abstract edit action corresponds to a character class or string disjunction in rf. An embodiment thus learns a decision tree that uses features from rows where value v∈Lrf to predict the value that allowed transitioning on an edge in the unrolled DAG that has the target character class or string disjunction.

Example 5. Consider value "A2.A3." in row 2 from FIG. 11 and the associated unrolled DAG, which has two [0-9] edges, which match 2 and 3, respectively. Similarly, value "A5.A7." on row 4 matches 5 and 7. For the first edge, this yields two training examples row 2->2 and row 4->5 for the decision tree.

To learn decision trees over these training examples, some embodiments first extract Boolean features from each row. This is accomplished in some embodiments using an adaption of a Cornet system for conditional formatting in tables and involves generating predicates over a set of templates to use as features.

FIG. 13 shows all supported predicate templates and their arguments in some embodiments. Variations omit one or more of these predicates, add one or more other predicates, or do both. The v argument denotes the column value. For example, equals (col1, "AR") matches the cells in column col1 which are equal to "AR".

To generate candidate string constants s, some embodiments consider the set of column values and tokens after splitting (separately) on non-alphanumeric characters, case changes, and switches between contiguous alphabetic and numeric characters. For length (v, n) some embodiments consider the top 5 most frequent cell lengths in the column. In tables with multiple columns, some embodiments generate these predicated-based features over every column.

Example 6. Consider the first row in FIG. 9. For the Player ID column and TextContains (c, s), some embodiments generate four constants for s. The first is the value itself (Ind-674-PRO). Splitting the cell obtains tokens {Ind, 674, PRO,-}. As TextContains (Player ID,-) is true for all cells in the column, this is not considered and dropped. Some embodiments get four features from the first row: TextContains (Player ID, Ind), TextContains (Player ID, 674), TextContains (Player ID, Pro), TextContains (Player ID, Ind-674-Pro).

To learn each decision tree, some embodiments sample trees with varying numbers of split nodes and depths, filter down to those with an accuracy of at least alpha (default 0.8), rank trees in ascending order of (nodes, depth), and take the first such tree. This tree is applied to a repair that has abstract edits to predict the concretized candidate repair.

3.5 Ranking Repair Candidates

In some embodiments and some scenarios, a DataVinci™ technology repair procedure produces multiple edit programs 318, since there may be multiple significant patterns. To address this challenge, some embodiments use a heuristic candidate ranker 310. This heuristic corresponds to a weighted linear combination of edit script properties. In internal evaluation implementations, the weights were manually set based on qualitative analysis on a small held-out set of 100 columns sampled from a corpus of Excel® spreadsheets. Developers looked at repairs that came out, manually assessed if they seemed reasonable, and adjusted edit script property weight values to penalize bad suggestions and raise to the top suggestions the developers identified as targets the repairs procedure should produce to get good quality repairs. The four properties are (1) string edit distance between erroneous value and the repaired value, (2) count of alphanumeric edit operations, (3) string edit distance of repaired value to closest value in column, and (4) fraction of column matching the significant pattern used to generate the repair. In a variation, a language model is trained on weights, a larger corpus, repair accuracies (based, e.g., on feedback from user interaction with nominally repaired values), and repair costs, or similar data, and is utilized to set or adjust the edit script property weight values automatically.

3.6 Execution-Guided Repair

In some embodiments and some scenarios, a DataVinci™ technology pattern-based detection relies on an assumption that the significant patterns 206 characterize the data distribution well, and that values which do not satisfy such patterns are data errors. However, not all string data 124 will serve as a basis to produce a significant pattern, nor will significant patterns learned over all values necessarily highlight all errors. To address this challenge, some embodiments exploit 508 execution information from programs that operate on columns, to further refine error detection and repair suggestions. This improvement comes from learning 402 a significant pattern set Rm that accounts for different execution outcomes.

Let P be a program that reads a subset of columns in a table, including a target cleaning column c. Then P is a column-transformation program if it can execute over each row tuple independently and produces one or more output values for each row, thus generating one or more output columns.

Example 7. Consider a table with two columns c1= [x, y, z] and c2= [a, b, c]. A program concat (c1, c2), which produces [xa, yb, zc], is a column-transformation program, while first (c1), which produces x is not.

Some embodiments execute a column-transformation program on T and group executions into successes and failures. Grouping is guided by signals such as exceptional values such as nan, or program exceptions, or subsequent user interactions such as copying and pasting values which indicates success, or manual editing values which indicates failure. The non-exception group (the successes) is then provided to a regular expression learner 304 and all patterns learned are treated as significant patterns Rm. All values v in a target column that were inputs to a failing execution are identified as data errors, and an embodiment applies the repair procedure previously described.

In some settings, the column-transformation program cannot be executed. In some cases, the column-transformation program can nonetheless be analyzed via static analysis or simulation by a program analyzer 308 which extracts outcome or likely outcome information that can guide the repair.

FIG. 21 illustrates a scenario using program information exploitation 508. As noted, not all data will satisfy significant pattern assumption, but if a user is writing a program, some embodiments use this information when repairing an error.

3.7 Example with State Transitions

Figure 30:
FIG. 30 is a diagram illustrating an outlier in the FIG. 24 data.
Figure 31:
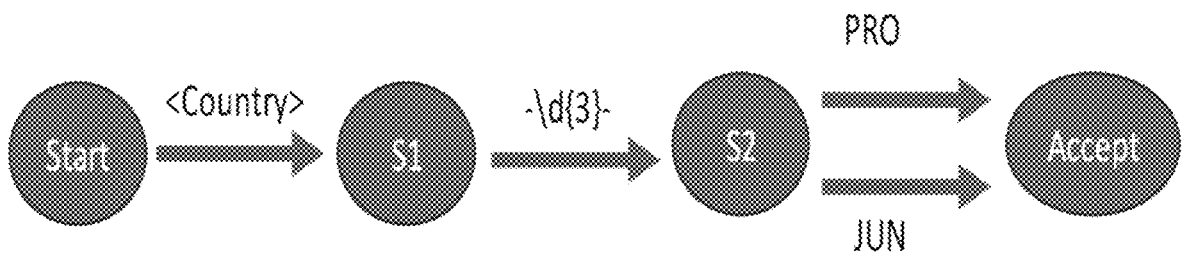
Figure 32:
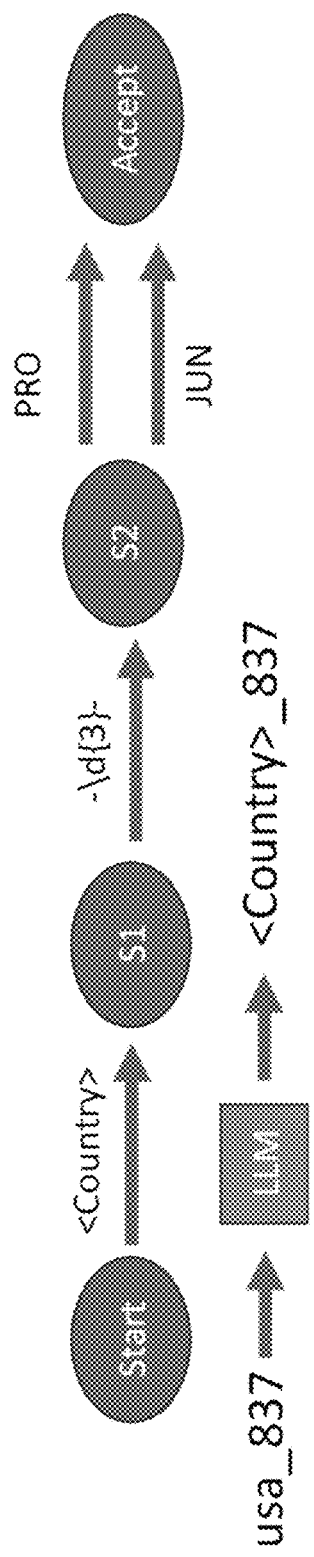
Figure 33:
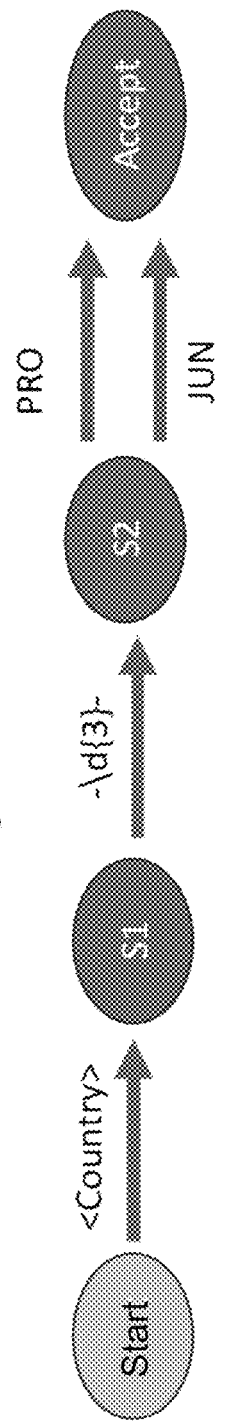
Figure 34:
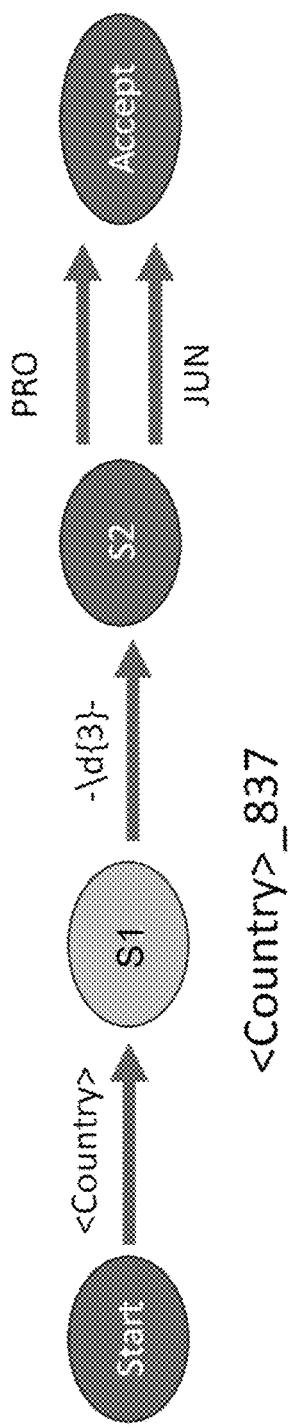
Figure 35:
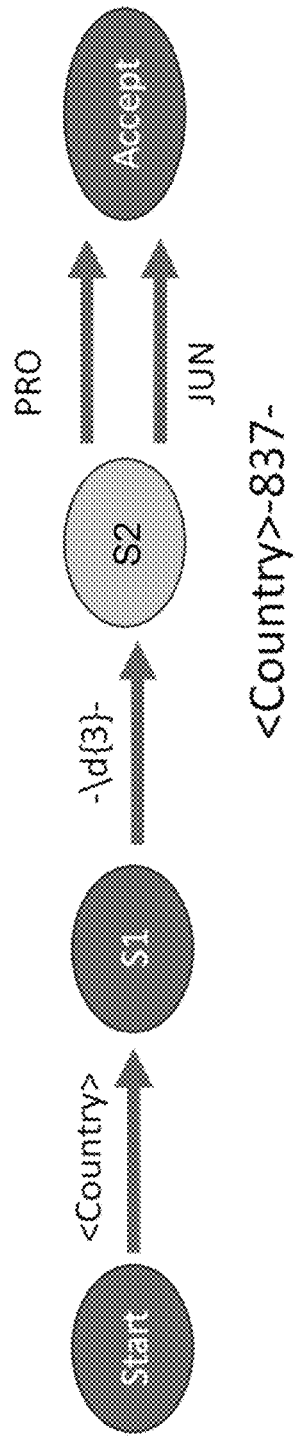
Figure 36:
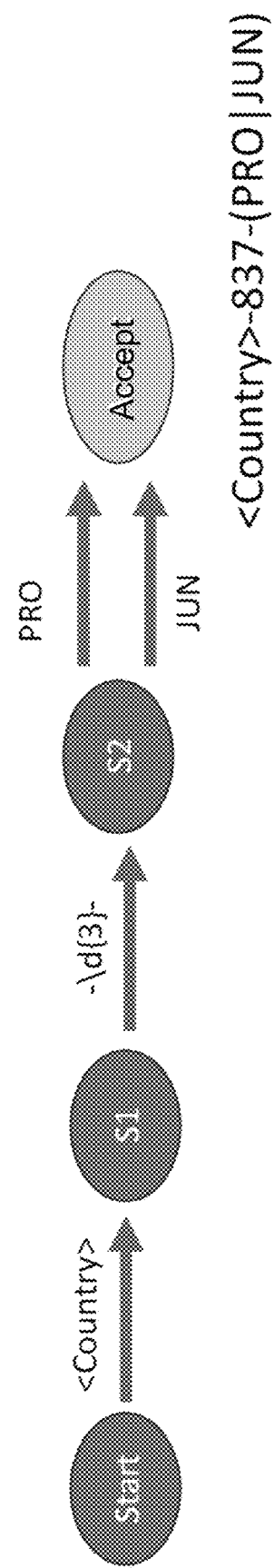
Figure 37:
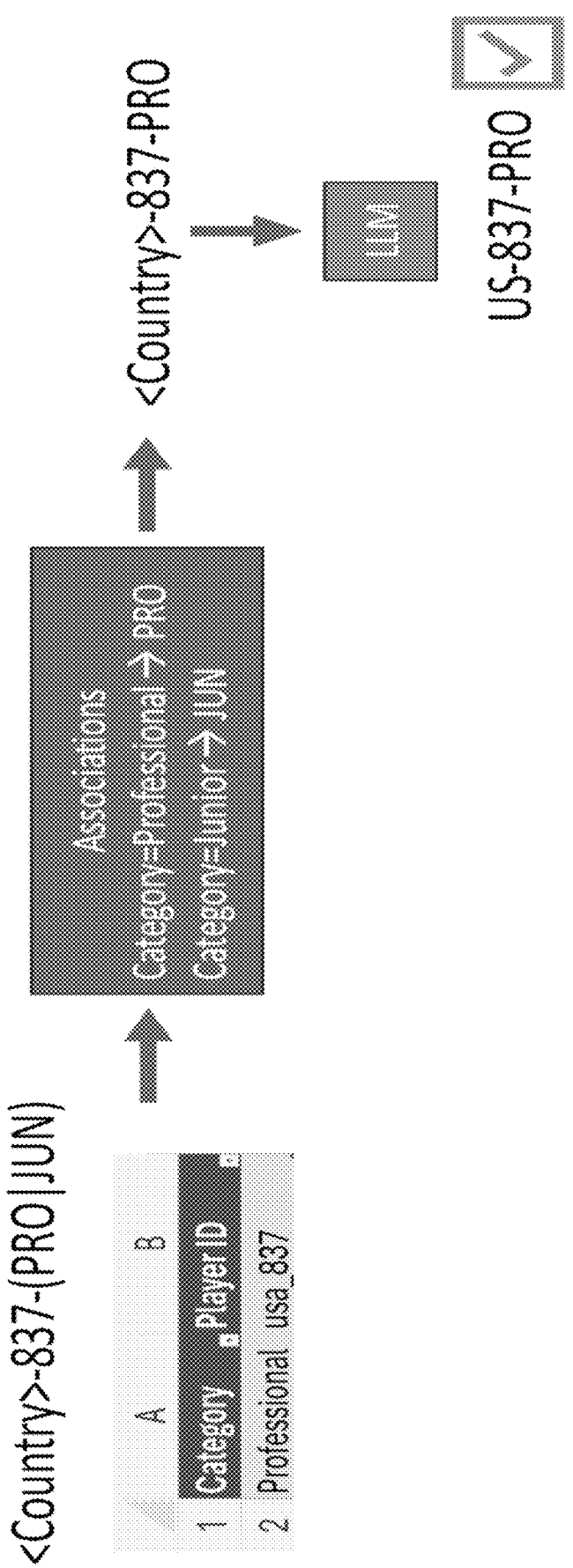

FIGS. 31 through 37 collectively illustrate use of a pattern to drive edits of the FIG. 30 outlier, in which FIG. 31 shows the pattern and a state transition diagram, FIG. 32 shows abstraction of an outlier string data value by a language model, FIG. 33 shows the state transition diagram in a start state, FIG. 34 shows the state transition diagram in a state S1, FIG. 35 shows the state transition diagram in a state S2, FIG. 36 shows the state transition diagram in an accept state accepting a substring abstraction, and FIG. 37 shows concretizing the substring abstraction and thereby editing the substring in a manner that repairs syntactic and semantic errors in the outlier string data value.

In particular, the example of FIGS. 30-37 uses the choice between PRO and JUN represented in the mixed pattern <Country>-837-(PRO|JUN) as an example of abstraction and character classes. Some embodiments learn associations with other columns for non-outliers, and treat such a concretization choice as a classification over choice for non-outliers for i-th non-deterministic choice in the regex satisfied. The FIG. 30 dataset supports these associations: Category=Professional->PRO, Category=Junior->June. Applying this to the row entries {Professional, usa_837} with the pattern <Country>-837-(PRO|JUN) yields <Country>-837-PRO. That result is sent to the LLM, which does a spelling correction and outputs US-837-PRO.

3.8 Cleaning Helps Data Analysis

Figure 38:
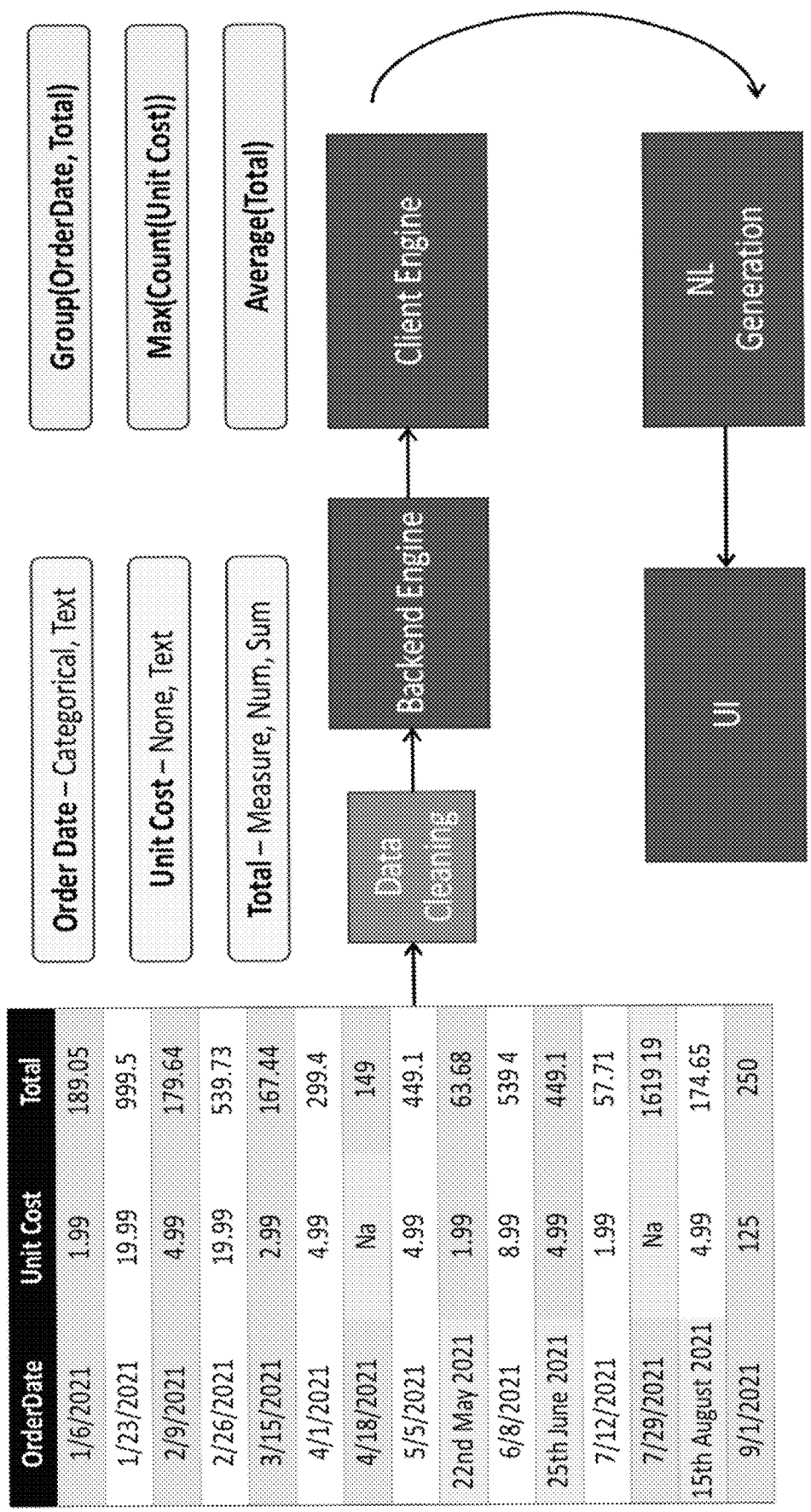
FIG. 38 is a data flow diagram illustrating use of string error mitigation functionality to perform data cleaning in order to facilitate data analysis.

FIG. 38 illustrates use of string error mitigation functionality to perform data cleaning in order to facilitate data analysis. For example, cleaning helps spreadsheet formula execution and data analysis operations such as sorting, aggregation, and statistical operations. In some embodiments and situations, when the data will be input to an anomaly detector, cleaning the data before it is input facilitates more accurate anomaly detection. In some embodiments and situations, the cleaning is an example of anomaly detection. In some embodiments and situations, when data will be input to a data analysis system, cleaning the data before it is input facilitates more accurate analysis insights. During evaluation, out of 100 tables, an InsightsService™ data analysis failed to generate any insight on 18 tables (mark of Microsoft Corporation). After cleaning, it was able to generate Insights for all but 3 tables. Furthermore, cleaning the table also improved the column and category detection in an AnalyzeData™ data analysis (mark of Microsoft Corporation).

4 Evaluation Setup 4.1 Hardware Specifications

All experiments of the internal evaluation were carried out using Python (version 3.8.7) on a machine with an Intel® Core i7 processor (base at 1.8 GHZ), K80 GPU, 64-bit operating system, and 32 GB RAM (mark of Intel Corporation).

4.2 Benchmarks

Internal evaluation was on four benchmarks. The internal evaluation used a benchmark of published web tables, and evaluators also collected data and designed three new Excel®-based benchmarks. Statistics of these benchmarks are shown in FIG. 14.

The Wikipedia Tables dataset was built on a published Wikipedia® tables dataset. A sample of 1000 tables with manually annotated system predictions was extended with manual annotations for DataVinci™ testing and baselines.

The Excel® dataset included 200 tables sampled from workbooks drawn from a corpus of 1.8 million publicly available Excel® workbooks from the web. Similar to the Wikipedia benchmark, evaluation ran all available systems on the sampled tables, manually annotated their suggestions, and reported precision.

The Synthetic Errors dataset included 1000 Excel® tables (disjoint from the Excel® benchmark) sampled from the same corpus previously described. Evaluators then synthetically introduced errors with the goal of measuring recall. To introduce errors, evaluators applied the following noise operations: (1) random character insertion, deletion and change, (2) random delimiter insertion deletion and change, (3) random digit swap, (4) random shuffle of characters, (5) random capitalization, (6) random decimal, comma swap in numerics, (7) visually-inspired typos {o->0, 1->1, e->3, a->4, t->7, s->5}. Evaluators randomly corrupted cells with 20% probability. For each of the cells corrupted, there was a 25% probability of applying 1, 2, 3, or 4 noise operations, sampled without replacement from the set of operations described. Because it is likely there were already real data errors present in the data, systems 202 may detect errors or suggest repairs for cells beyond the synthetically corrupted cells. As a result, evaluation focused analysis on recall of the synthetic errors, but reported precision (which will be naturally deflated) and F1 for completeness.

The Excel® Formulas dataset included data of the form (formula, input columns), where formula is an Excel® formula used to define a column (all rows have the same formula, modulo input values), and input columns correspond to the input values to execute the formula. Evaluation was restricted to formulas where input values and output value are part of the same table. The task was to repair any data errors in the input columns such that the formula evaluated without producing any error values. To construct this dataset evaluators sampled 15,000 tables from the Excel® corpus previously described, extracted 11,000 formulas where at least 1 cell and less than 25% of cells result in an error value. Of these 11,000 formulas, 7,200 have a single column input and 3,800 have multiple column inputs (on average 3.4). Evaluation used this dataset to evaluate the impact of execution-guidance in string data cleaning.

4.3 Baselines

Evaluation compared DataVinci™ technology against various baselines as summarized below:

| System | Category |
| --- | --- |
| WMRR | Detection + Repair |
| HoloClean | Detection + Repair |
| Raha | Semi-supervised Detection |
| Auto-Detect | Detection |
| Potter's Wheel | Interactive Detection + Repair |
| T5 | Detection + Repair |
| GPT-3.5 | Detection + Repair |
| DataVinci | Detection + Repair |

(1) WMRR (weighted matching rectifying rules): an unsupervised approach to learn weighted data rectifying rules based on functional dependencies. Since the tool itself was not publicly available, to evaluate against WMRR evaluators reimplemented WMRR based on a published paper description of the WMRR tool.

(2) HoloClean: a data repair tool based on probabilistic inference, which can repair qualitative and statistical errors. Evaluators ran the code released on GitHub. HoloClean originally required that users provide denial constraints. To evaluate in a fully unsupervised setting, comparable to DataVinci™ technology, evaluation used a single vacuous denial constraint (specifically, column 1=column 1).

(3) Raha: an ensemble-like system that combines multiple error detection systems and semi-supervision to train an error detection system. As Raha required the user to annotate examples, the evaluation took the first (top-to-bottom) 5 ground-truth errors per column and provided these as examples.

(4) Auto-Detect: a co-occurrence-based error detection system, which also used regular-expressions to generalize values. Evaluation used the Wikipedia results released with a publish Auto-Detect paper. Unfortunately, evaluation was unable to run the tool on all benchmarks as it was not available publicly and as a result evaluation only reported performance on Wikipedia.

(5) Potter's Wheel: a data error detection and (semi-supervised) correction system based on functional dependencies. Evaluation leveraged the Potter's Wheel error detection annotations on the Wikipedia dataset released in an original Auto-Detect paper. Since evaluation did not run the Potter's Wheel system and relied on the Wikipedia annotations released, evaluation only reported Potter's Wheel results on the Wikipedia benchmark.

(6) T5: a transformer-based encoder-decoder model pre-trained on text. Evaluators fine-tuned T5 for the task of data repair. Since T5 was a text generation model, evaluation encoded each column as a stringified list of column values separated by a [September] token. The model was trained end to end to generate the repaired column, given the potentially noisy column as input. The training data consisted of 100 K dirty samples (generated by the same approach used in the synthetic benchmarks) and tasked with generating the original columns. Because evaluation ran T5 on a single column at a time, it did not consider other columns while repairing.

(7) GPT-3.5: a transformer-based decoder-only model. Evaluation used the same input structure used to train T5 to include the target column in GPT-3.5's prompt. Evaluation used GPT-3.5 in a few-shot setting, providing three static examples of a dirty column and the cleaned output the model should generate. The static examples were from Excel® data (disjoint from the benchmarks) and were hand annotated. Evaluation reported results at temperature 0 and top-1 generation. After experimenting with multiple temperatures, evaluators found temperature 0 works best on average, based on precision and F1 score across all benchmarks. To evaluate unsupervised repair when using detection-only systems, such as Raha, Auto-Detect, and Potter's Wheel, evaluation added a call to GPT-3.5 to include the outlier value and its column header along with 10 sample values selected based on spatial proximity (5 rows above and below and 3 columns to the left and to the right with headers). Evaluation asked the model to generate the repaired value. Evaluation sampled values to fit in the fixed prompt length of 4,000 tokens and make individual repair calls for each outlier detected.

5 Evaluation Results and Discussion

Results of the internal evaluation provide insight into the following questions:

Q1. Can DataVinci™ technology accurately detect string errors?

Q2. Can DataVinci™ technology accurately repair string errors?

Q3. Can DataVinci™ technology use program execution to improve repairs?

Q4. How do DataVinci™ technology architectural decisions impact performance?

5.1 Error Detection (Q1)

Evaluation results report precision for detection. Result reports leverage existing annotations where possible and otherwise manually annotate systems' predictions. Results reported precision, recall, and F1 on the synthetically corrupted dataset, computed with respect to the corruptions; as a result, the precision/F1 score can be deflated from preexisting data errors. In addition to metrics like precision, results also reported each system's average fire rate, defined as the average fraction of cells in a column that are labeled as data errors. FIG. 15 presents error detection results for evaluated DataVinci™ technology and baselines across three benchmarks.

Results indicate that DataVinci™ technology outperformed baselines in terms of precision on both the Wikipedia and the Excel benchmarks, despite having a higher firing rate than all but one baseline (T5). Auto-Detect, which is well-suited to the type of mistakes present in the Wikipedia dataset, performs competitively. Overall, evaluation results indicate that error detection is relatively easier on the Wikipedia benchmark, where tables on average have fewer rows, compared to the Excel benchmark.

On the synthetic benchmark, results indicate that DataVinci™ technology achieved the highest recall, followed by GPT-3.5. The learning-based approach taken by Raha also resulted in a recall rate that is comparable to the more expensive GPT-3.5-based solution. When performing qualitative inspection of the errors detected, results indicate that GPT-3.5 can identify errors in semantic substrings well. For example, in the following column of financial quarters, {Q1-22, Q4-21, Q5-20, Q2-20, Q1-21} GPT-3.5 correctly identifies the outlier to be Q5-20. However, GPT-3.5 fails to detect syntactic errors like S1.4 in the column, {S. 1.2, S.2.3, S1.4, S. 1.3, S.2.1}, where S1.4 is missing a period after S. Neural models like GPT-3.5 struggle at recognizing these patterns whereas DataVinci™ technology can detect such errors using regular-expression-based patterns.

Other tools, like Auto-Detect, worked well on syntactic errors but failed on semantic repairs. For example, consider the column of county and a numeric ID separated by an underscore {Alpine_231, Kings_721, Lake_201, Santa Clara_246, Nevad210}; the correct repair here is Nevad210→Nevada_210. This error involves a combination of syntactic and semantic inconsistency which most baseline systems struggle with. DataVinci™ technology combines semantic information via masking into its pattern based syntactic repair engine and thus detected this error (and generated the correct repair).

5.2 Error Repair (Q2)

For repair, often there are cases where various possible data repairs are reasonable and the correct repair cannot be uniquely identified. To account for this, evaluation annotated repair suggestions as possible if this was the case, and then annotated the suggestion as correct (meaning reasonable in this context) or not. Evaluation results reported repair precision for certain cases and precision for possible cases separately for completeness.

FIG. 16 shows the performance of tested DataVinci™ technology and baseline systems for repairing data on the benchmarks. Note that repair metrics combine: (1) detection (a system identifies an error before attempting to fix it), and (2) whether the repair matched the ground-truth repair.

Evaluation results indicate that DataVinci™ technology outperformed all baselines in terms of both certain and possible repairs on Wikipedia and Excel benchmarks and had the highest precision, recall, and F1 score on the synthetic test set. Raha+GPT-3.5 and Auto-Detect+GPT-3.5 had high precision (Wikipedia), but they have different behaviors. Specifically, Auto-Detect (by design) did not support inter-column dependencies, while Raha struggled to detect intracolumn patterns. WMRR and Potter's Wheel captured both inter-column and intra-column dependencies well but struggled with semantic repairs as they did not detect these issues. Both GPT-3.5 and T5 performed significantly worse on the synthetic dataset as the noise operations predominantly introduced syntactic errors with minimal semantic content.

FIG. 17 shows the precision rates when only considering correctly detected errors for each system as a way to disentangle the detection and correction effectiveness of each system. Repair precision is substantially higher across the board, if one only considers correct detections, and DataVinci™ technology outperformed in all three benchmark sets.

Consider cases where DataVinci™ technology was able to accurately repair data errors while baselines failed. These are mostly where either (1) DataVinci™ technology was able to leverage its semantic masking to suppress false positives; or (2) DataVinci™ technology detected a semantic anomaly using patterns. FIG. 19 shows an example from the Excel benchmarks, which contains a tournament table having a columns category (Junior or Professional) and a Player-ID which has three components (Country code, unique numeric ID, first three letters of category). For non-competing players, the ID is QUAL-followed by a unique numeric ID. The value usa_837 is an outlier in the Player-ID column and the correct repair should change it to US-837-PRO. As highlighted above, DataVinci™ technology (1) utilizes semantic masking to repair usa->US and (2) uses patterns, paired with concretization value constraints, to detect that the category substring is PRO.

Consider cases where DataVinci™ technology failed to generate the correct repair but one of the baseline systems succeeded. These cases were mostly the result of either (1) the column did not have any significant patterns due to irregular data, or (2) the error rate was too high and as a result the outlier was covered by a significant pattern. FIG. 20 shows one example for each case from the Excel benchmarks along with the incorrect repair generated by the tested DataVinci™ technology and the correct repair generated by the baseline. In the first example, the tested DataVinci™ technology learned two significant patterns RM= {[A-Z]+, [A-Z]+0} and hence did not detect the error. In the second example, since the column contains irregular data, the tested DataVinci™ technology was unable to learn a significant pattern (RM={ }) and thus did not detect any errors.

5.3 Execution-Guidance (Q3)

Evaluation used the Excel Formula benchmark to evaluate the extent to which tested DataVinci™ technology used execution information to provide improved repairs. Results report two execution metrics: the fraction of cells that no longer result in an error value, as well as the fraction of columns where no cell results in an error value (the formula succeeds fully).

To carry out this experiment, evaluation ran all baselines, applying repair suggestions only on values that were an input into a row that had an error value when the formula was originally executed. Results report formula-level and cell-level successful execution rates after applying each systems' suggestions.

FIG. 18 summarizes execution-guided learning results. Results indicate that DataVinci™ technology with execution-guided learning improved over all baselines (excluding HoloClean which did not scale) including the fully unsupervised DataVinci™ technology. While all systems have implicit access to execution information, since evaluation only applied their repairs to inputs associated with erroneous executions, DataVinci™ technology with execution-guided learning was the only system that also incorporated this information (by affecting the patterns learned Rm) when learning how to repair the data error.

Evaluation compared unsupervised and execution-guided DataVinci™ technology. Both (a) distribution of original value to suggested repair edit distances and (b) number of repairs per column moved higher when given execution information. Jointly, this indicated that with execution information DataVinci™ technology is capable of offering more repairs, with higher complexity (as proxied by string edit distance), than without execution information usage as taught here. The comparison included the distribution of string edit distances from original data error to repaired suggestion, as well as the number of repairs per column. Results indicate that when provided with execution information DataVinci™ technology produced more repairs, and these repairs tended to have a higher distance to the original value (implying possibly more complex repairs). For example, FIG. 21 shows an example where DataVinci™ technology with execution learns the correct repair, resulting in successful execution of the formula, while the unsupervised variant is unable to provide any suggestions because the pattern C [0-9]{2} repeats enough times to be considered a significant pattern.

5.4 Architectural Decisions (Q4)

This part of the discussion examines how various architectural decisions impacted the performance of DataVinci™ technology. Specifically, this part investigates the importance of semantic abstraction/concretization, concretization value constraints, and ranking. Evaluation carried out experiments using the synthetically corrupted benchmark; these results are summarized in FIG. 22.

5.4.1 Semantic Substrings. To evaluate the impact of having semantic information in repairs (see Section 3.2), two versions of DataVinci™ technology were evaluated.

Evaluators implemented a version of DataVinci™ technology that treated all strings as purely syntactic (no semantic abstraction) and a version that was capable of performing semantic abstraction but was restricted to re-use the same substring for concretization, meaning it could not repair errors in semantic substrings (limited semantic concretization).

Results indicate that both versions provided lower performance than full DataVinci™ technology, but removing semantics altogether had a comparatively larger impact on precision and F1.

5.4.2 Concretization and Ranking. To study the effect of learned concretization value constraints and ranking (see Section 3.4 and 3.5), evaluators implemented two ablated version of DataVinci™ technology: (1) where the DataVinci™ technology did not learn to concretize abstract edits, but instead enumerated all candidates and directly passed them through to the heuristic ranker (no learned concretization); and (2) a version where all candidates were ranked based only on the shortest string edit distance with respect to the original data error (edit distance ranking). FIG. 22 shows that while removing either learned concretization or ranking had a negative impact on performance, removing learned concretization constraints had a larger effect.

5.5 Runtime Performance

FIG. 23 shows some computational resource costs, including the average time taken, disk space used, and RAM+GPU VRAM used to detect (Raha, Potter's Wheel, Auto-Detect) or to detect+repair (WMRR, HoloClean, T5, GPT-3.5, DataVinci) errors on the Wikipedia benchmark. Evaluation results report Potter's Wheel and Auto-Detect based on a published Auto-Detect paper which reports these metrics in a similar environment and on the same benchmarks. Note that GPT-3.5 includes network time. Results indicate that in terms of time and disk space, tested DataVinci™ technology was competitive with alternatives such as WMRR, Raha, and Auto-Detect, while using substantially less RAM. Since T5 and HoloClean also utilize a GPU and don't run purely on CPU memory, results report the sum of GPU and CPU memory usage under Memory. Results only report inference resources but it is worth noting that T5 also required training which took 4 hours on a K80 GPU. HoloClean and T5 are the most resource intensive systems, as a result of their implementation complexity. DataVinci™ technology, WMRR and Raha were up to 4 times faster than HoloClean/GPT-3.5 and required fewer computational resources to run.

6 Limitations

Some limitations of the DataVinci™ technology evaluation are noted. The internal evaluation only evaluated the tested DataVinci™ technology on English language values. As a practical matter, applicability to non-English datasets may be limited, but this is not an inherent limitation of all embodiments taught herein. The tested DataVinci™ technology did not handle inter-table constraints, limiting its effectiveness when data consistency relied on relationships across multiple tables, but this is not an inherent limitation of all embodiments taught herein. The tested DataVinci™ technology relied on identifying recurring patterns to perform error detection/repair, which may not occur in all data. Execution-guided repair tends to mitigate this limitation but its applicability may be limited as a practical matter by the availability of programs that read the target data and the ability to easily execute these programs. However, execution program availability is not an inherent limitation of all embodiments taught herein.

In contrast to some approaches, some embodiments taught herein do not use fixed patterns to detect errors but rather learn the patterns they use. Some embodiments not only detect data errors but also repair them. In addition, some embodiments can detect and repair errors in strings with both syntactic and semantic substrings.

In contrast to some approaches, some embodiments taught herein use a pattern-based approach to data repair, do not require any user specification in the form of constraints or annotated examples, and can repair strings that have a combination of both syntactic and semantic substrings. Some embodiments combine syntactic and semantic information. Some leverage regular expressions to formally describe string values. Some do not have user examples or definitions but rather learn patterns fully unsupervised. Some use an LLM or other language model to identify semantic substrings, and when learning the regular expression some employ abstraction/concretization, which allows them to incorporate, invoke, or otherwise use an existing regular expression learner.

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as executing a machine learning language model 208, automatically and proactively detecting errors in string data without user input beyond the string data, and automatically and proactively deriving edit programs utilizing, e.g., NFAs, which are each an activity deeply rooted in computing technology. Some of the technical mechanisms discussed include, e.g., language models 208, regular expressions 206, and directed acyclic graph data structures. Some of the technical effects discussed include, e.g., fully unsupervised detection and repair of errors in string data, reduced consumption of computational resources relative to other approaches evaluated, and detection and repair of both syntactic and semantic errors in string data. Thus, purely mental processes and activities limited to pen-and-paper are clearly excluded. Other advantages based on the technical characteristics of the teachings will also be apparent to one of skill from the description provided.

One of skill understands that string error mitigation is a technical activity which cannot be performed mentally, because it requires usage of computing system memory 112 and processors 110. This includes, for example, learning 402 patterns 206 in string data without hints from users. As disclosed herein, string error mitigation also involves executing a machine learning language model 208, which cannot be performed mentally or manually. Moreover, mental or pen-and-paper activity cannot configure a computing system to perform string error mitigation as described herein with anywhere near the same accuracy and speed. One of skill also understands that attempting to perform string error mitigation manually would create unacceptable delays in program execution, and would introduce a severe risk of human errors that can cause program errors. People manifestly lack the speed, accuracy, memory capacity, and specific processing capabilities required to perform string error mitigation via learning 402, masking 404, deriving 408, predicting 410, and repairing 412 as taught herein.

In particular, automatic string error mitigation (including error detection and repair) is a part of computing technology. Hence, the string error mitigation improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application to simplify user interactions and otherwise improve data importing, such as a spreadsheet tool 134 (e.g., Excel® software or other spreadsheet application), software as a service for use in locating, gathering, compiling, analyzing, modeling, graphing, visualizing, animating, transforming, presenting and sharing data and other information (e.g., Power BI® offerings or other SaaS providing data management services or data analytics services), or an extension of an integrated development environment (e.g., a Data Wrangler™ extension of a VS Code® IDE) in a system 202 (marks of Microsoft Corporation).

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to both detect and repair errors in string data, how to detect and repair both syntactic and semantic errors in string data, and how to detect and repair errors in string data when the data itself does not exhibit a majority syntactic pattern. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present subject matter, has no role in interpreting the claims presented in this patent disclosure.

Note Regarding Hyperlinks

Portions of this disclosure refer to URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have any URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

For present purposes, a language model is "large" if it has at least a billion parameters. For example GPT-2 (OpenAI), MegatronLM (NVIDIA), T5 (Google), Turing-NLG (Microsoft), GPT-3 (OpenAI), GPT-3.5 (OpenAI), and GPT-4 (OpenAI) are each a large language model (LLM) 208 for purposes of the present disclosure, regardless of any definitions to the contrary that may be present in the industry.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. String error mitigation operations such as learning 402 a significant pattern, e.g., a majority pattern, identifying 406 and masking 404 a semantic substring, deriving 408 a candidate repair, predicting 410 a concrete value, and many other operations discussed herein (whether recited in the Figures or not), are understood to be inherently digital. A human mind cannot interface directly with a CPU or other processor, or with RAM or other digital storage, to read and write the necessary data to perform the string error mitigation steps 500 taught herein even in a hypothetical prototype situation, much less in an embodiment's real-world large computing environment which involves mitigating errors in datasets 124 that contain megabytes of string data. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112 (f) claim interpretation. Any presumption to that effect is hereby explicitly rebutted.

For the purposes of United States law and practice, the claims are not intended to invoke means-plus-function interpretation unless they use the phrase "means for" or the terms "means" following by functional language. Claim language intended to be interpreted as means-plus-function language, if any, will expressly recite that intention by using the phrase "means for" or "means" followed by functional language. When means-plus-function interpretation applies, whether by use of "means for", "means", and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

In particular, specification support for "regular expression learner means" includes at least all discussion herein of a pattern learner, e.g., learner 304 or code which performs learning 402. Specification support for "masker means" includes at least all discussion herein of a substring masker, e.g., code which performs identifying 406 or masking 404. Specification support for "edit deriver means" includes at least all discussion herein of a repair engine, e.g., repair engine 306 or code which performs deriving 408. Specification support for "value predictor means" includes at least all discussion herein of a repair engine, e.g., repair engine 306, or code which performs predicting 410.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as abstracting, advancing, analyzing, applying, calculating, concretizing, constraining, converting, defining, deleting, deriving, detecting, editing, executing, exploiting, forming, generating, identifying, inserting, learning, masking, matching, modifying, performing, predicting, producing, prompting, ranking, receiving, relying on, repairing, requesting, sampling, sending, simulating, sorting, splitting, substituting, transforming, transitioning, unrolling, using, utilizing (and abstracts, abstracted, advances, advanced, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor or set of processors; includes hardware
- 112 computer-readable storage medium, e.g., RAM, hard disks
- 114 removable configured computer-readable storage medium
- 116 instructions executable with processor; may be on removable storage media or in other memory (volatile or nonvolatile or both)
- 118 digital data in a system 102; data structures, string values (a.k.a. strings), semantic types, rankings, thresholds, masks, and other examples are discussed herein
- 120 kernel(s), e.g., operating system(s), BIOS, UEFI, device drivers; also refers to an execution engine such as a language runtime
- 122 software tools, software applications, security controls; computational
- 124 dataset generally, i.e., set of data values in a computing system, with particular attention in many examples to a string dataset, which is a set of string values
- 126 display screens, also referred to as "displays"
- 128 computing hardware not otherwise associated with a reference number 106, 108, 110, 112, 114
- 130 user interface
- 132 spreadsheet, generally refers to a dataset suitable for processing by a spreadsheet tool, but depending on context also refers to spreadsheet tool
- 134 spreadsheet tool 122; computational
- 136 cloud, also referred to as cloud environment or cloud computing environment
- 202 enhanced computing system, i.e., system 102 enhanced with functionality 204 as taught herein
- 204 string error mitigation functionality (also referred to as "DataVinci™ functionality" or "functionality 204" or "technology 204"), e.g., software or specialized hardware which performs or is configured to perform steps 402 and 408, or steps 402, 408, and 412, or steps 502 and 412, or steps 408 and 412, or any software or hardware which performs or is configured to perform a novel method 500 or a computational string error mitigation activity first disclosed herein
- 206 syntactic pattern or mixed syntactic-semantic pattern (see, e.g., FIG. 26), deemed significant for a given dataset if followed by at least a defined fraction of the values in the dataset, e.g., if fraction is 50% plus nonzero positive epsilon then the significant pattern is also a majority pattern
- 208 language model, e.g., neural network machine learning model trained for text transformation, large language model, word n-gram language model, recurrent neural network-based model, transformer architecture model; some embodiments use a more general machine learning model instead of or in addition to a language model
- 302 string error mitigation software, also referred to as DataVinci™ software, e.g., software which upon execution performs or provides functionality 204
- 304 pattern learner; computational; in some embodiments includes symbolic pattern matcher which clusters values and checks for patterns, and makes guesses accordingly, or LLM, or combination thereof; some pattern learners utilize feedback received via a user interface
- 306 repair engine; computational
- 308 program analyzer; computational
- 310 candidate ranker; computational
- 312 error confidence fraction a.k.a. threshold; digital
- 314 constraint, e.g., relationship, as represented in a computing system
- 316 semantic type, as represented in a computing system
- 318 edit program, a.k.a. repair or execution thereof result, as represented in a computing system
- 320 language model prompt, as represented in a computing system
- 322 matrix, as represented in a computing system
- 324 interface generally in a computing system, e.g., API; computational, digital; also refers to particular kinds of interfaces such as interface to a language model, interface to a pattern learner or a repair engine (either or both of which may be or include a language model)
- 400 flowchart; 400 also refers to string error mitigation methods that are illustrated by or consistent with the FIG. 4 flowchart or any variation of the FIG. 4 flowchart described herein
- 402 computationally learn a pattern 206
- 404 computationally mask a semantic substring; 404 also refers to a mask as represented in a computing system
- 406 computationally identify a semantic substring or a semantic data type of a substring, or both
- 408 computationally derive an edit program a.k.a. a repair
- 410 computationally predict a concrete value for a masked substring
- 412 computationally repair a string error, at least in part by executing
- 414 an edit to a string
- 414 computationally execute one or more edits to a string
- 500 flowchart; 500 also refers to string error mitigation methods that are illustrated by or consistent with the FIG. 5 flowchart, which incorporates the FIG. 4 flowchart and other steps taught herein, or methods that are illustrated by or consistent with any variation of the FIG. 5 flowchart described herein

502 computationally perform unsupervised error detection

504 computationally avoid reliance on user inputs (other than the data being error mitigated, which is itself user input in some scenarios), e.g., by performing string error mitigation without relying on user-provided examples, annotations, or constraints during the system's performance of the string error mitigation; avoiding reliance includes not asking for such user input, not receiving such user input, or receiving such user input but not basing string error mitigation on such received user input

506 computationally rank edit programs

508 computationally exploit program execution information or a program which is not per se part of a pattern learner or a repair engine

510 computationally utilize a language model, e.g., the learn 402 a pattern or predict 410 a concrete value or otherwise as taught herein

512 computationally modify a threshold, e.g., threshold 312

514 computationally prompt a language model, e.g., with a unitary prompt

516 computationally form and utilize a data structure in a computing system, e.g., a directed acyclic graph, a nondeterministic finite automaton, a cost matrix, or a moves matrix

518 any step or item discussed in the present disclosure that has not been assigned some other reference numeral; 518 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments perform 502 fully unsupervised string error detection and repair, for strings 124 containing both syntactic errors and semantic errors. In some embodiments, string error mitigation includes learning 402 a regular-expression-based pattern 206 that characterizes at least a predefined fraction of a set of string data values, identifying 406 and masking 404 a semantic substring, deriving 408 edits to repair a string which contains the semantic substring, and replacing 414 a mask value with a replacement substring that conforms to the pattern. Some embodiments utilize 510 one or more language models 208. Some embodiments include or utilize a pattern learner 304, one or more learned significant patterns 206, a program analyzer 308, a candidate repair ranker 310, and a repair engine 306. Some embodiments exploit 508 program execution information to generate patterns 206 when significant patterns are not initially found.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A string error mitigation method performed by a computing system, the method comprising:
    learning a regular-expression-based pattern that characterizes at least a predefined fraction of a set of string data values, the learning comprising utilizing an inductive synthesis framework;
    identifying, and masking out with a mask value, a substring based on a predefined set of semantic data types;
    deriving one or more edits to repair a string which contains the mask value, the deriving comprising extracting a minimal sequence of edits through dynamic programming; and
    replacing the mask value by a replacement substring which conforms to the regular-expression-based pattern.

2. The method of claim 1, wherein the method performs fully unsupervised error detection on the set of string data values, and the method performs fully unsupervised error correction on the set of string data values.

3. The method of claim 1, wherein the method comprises:
    getting program execution information of a program which lists a string as an input to the program; and
    exploiting at least a portion of the program execution information for error detection or error correction or both.

4. The method of claim 1, wherein a full performance of the method is performed without reliance during the full performance on any user interaction during the full performance as a source of: a constraint, an example, or an annotation.

5. The method of claim 1, wherein the method comprises learning a relationship between a non-error value and a significant pattern, and using the relationship as a constraint when predicting a concrete value in the repaired string.

6. The method of claim 1, wherein the method comprises ranking a set of candidate repairs.

7. The method of claim 1, wherein the method comprises exploiting outcome information from execution of a string dataset transformation program which received at least part of the set of string data values as input, the exploiting comprising:
    learning at least one non-negative-outcome-based pattern which is based solely on string data values which are not associated with any negative outcome from execution of the string dataset transformation program; and utilizing a learned non-negative-outcome-based pattern to perform string repair.

8. The method of claim 1, wherein the method comprises submitting a set of one or more prompts to a language model, the set of one or more prompts comprising:
   an identification of a semantic type in string data as being a sematic type;
   an example with a non-masked example data portion and a corresponding masked example data portion; and
   an inference request with a non-masked inference data portion and a request for a corresponding masked inference data portion.

9. The method of claim 1, wherein the method is further characterized in at least one of the following ways:
   the regular-expression-based pattern characterizes at least half of the set of string data values; or
   the method comprises modifying a threshold which specifies the predefined fraction of the set of string data values.

10. The method of claim 1, wherein deriving one or more edits to repair a string which contains the mask value comprises receiving from a language model at least of: a spelling correction, or a correction which changes a semantic type of a corrected substring.

11. The method of claim 1, wherein the method comprises prompting a language module with a unitary prompt that includes multiple string data values of the set of string data values together in the unitary prompt.

12. The method of claim 1, wherein the method comprises converting the regular-expression-based pattern into a non-deterministic finite state automaton, forming a directed acyclic graph, and utilizing the directed acyclic graph for calculating an edit cost of a candidate repair of a string data value of the set of string data values.

13. A string error mitigation computing system, comprising:
   a digital memory;
   a processor set comprising at least one processor, the processor set in operable communication with the digital memory;
   a pattern learner interface which upon execution by the processor set sends a set of string data values to a pattern learner, and receives a set of one or more significant patterns from the pattern learner, the set of significant patterns including a set of one or more regular expressions which collectively match a predefined fraction of the string data values, and which also collectively define at least one outlier string data value; and
   a repair engine interface which upon execution by the processor set sends a repair engine at least one significant pattern and at least one outlier string data value, and receives at least one edit program from the repair engine which upon edit program performance edits the outlier string data value to produce an edited outlier string data value which conforms to at least one significant pattern.

14. The system of claim 13, wherein the pattern learner comprises a language model interface which upon execution by the processor set accesses a language model, the set of significant patterns is learned by the language model, and at least one significant pattern includes a masked substring which is based on a semantic data type.

15. The system of claim 13, further comprising a ranker which upon execution by the processor set ranks candidate edit programs based on at least respective edit costs of the edit programs.

16. The system of claim 13, wherein the system comprises:
   a cost matrix which represents edit costs of a candidate edit program; and
   a move matrix which represents edit actions of the candidate edit program.

17. The system of claim 13, further comprising a string data transformation program analyzer, which upon execution by the processor set analyzes actual execution outcomes or simulated execution of a string dataset transformation program, or both, and wherein the system utilizes a result of executing the transformation program analyzer as a basis of learning at least one significant pattern.

18. A computer-readable storage device configured with data and instructions which upon execution by a processor cause a computing system to perform a string error mitigation method, the string error mitigation method comprising:
   an AI-based regular expression learner means learning a regular-expression-based pattern that characterizes at least a predefined fraction of a set of string data values;
   an AI-based semantic substring masker means identifying, and masking out with a mask value, a substring based on a predefined set of semantic data types;
   the AI-based regular expression learner means treating the mask value as a placeholder character;
   an edit deriver means of the computing system deriving one or more edits to repair a string which contains the mask value;
   an AI-based value predictor means predicting a replacement substring; and
   the computing system replacing the mask value by the replacement substring.

19. The computer-readable storage device of claim 18, wherein the method comprises executing a string dataset transformation program on string data values, thereby producing execution outcomes, and learning at least one regular-expression-based pattern based solely on string data values which are not associated with any negative execution outcome.

20. The computer-readable storage device of claim 18, wherein the method comprises detecting and repairing syntactic errors and semantic errors in the string data values.

* * * * *